(12) United States Patent
Nojiri et al.

(10) Patent No.: US 9,507,392 B2
(45) Date of Patent: Nov. 29, 2016

(54) INFORMATION PROCESSING SYSTEM, AND ITS POWER-SAVING CONTROL METHOD AND DEVICE

(75) Inventors: Tohru Nojiri, Tokyo (JP); Jun Okitsu, Yokohama (JP); Yuki Kuroda, Musashino (JP); Eiichi Suzuki, Sakuragawa (JP); Takeshi Kato, Akishima (JP); Tatsuya Saito, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 13/548,536

(22) Filed: Jul. 13, 2012

(65) Prior Publication Data
US 2013/0111492 A1 May 2, 2013

(30) Foreign Application Priority Data
Oct. 27, 2011 (JP) .................... 2011-235537

(51) Int. Cl.
*G06F 9/46* (2006.01)
*G06F 1/20* (2006.01)
*G06F 1/32* (2006.01)
(Continued)

(52) U.S. Cl.
CPC ............. *G06F 1/206* (2013.01); *G06F 1/3203* (2013.01); *G06F 9/45558* (2013.01); *G06F 9/5094* (2013.01); *G06F 3/0625* (2013.01); *G06F 2009/4557* (2013.01); *G06F 2009/45591* (2013.01); *H04L 67/1008* (2013.01); *Y02B 60/1246* (2013.01); *Y02B 60/1275* (2013.01); *Y02B 60/142* (2013.01)

(58) Field of Classification Search
None
See application file for complete search history.

(56) References Cited

U.S. PATENT DOCUMENTS

| 8,127,298 B2 | 2/2012 | Kato et al. |
| 8,145,927 B2 | 3/2012 | Okitsu et al. |

(Continued)

FOREIGN PATENT DOCUMENTS

| CN | 101556493 A | 10/2009 |
| CN | 102016748 A | 4/2011 |

(Continued)

OTHER PUBLICATIONS

Chinese Office Action dated Feb. 4, 2015 (19 pages).

(Continued)

*Primary Examiner* — Mengyao Zhe
(74) *Attorney, Agent, or Firm* — Crowell & Moring LLP

(57) ABSTRACT

Pieces of working information on workloads, positions of the workloads, pieces of environmental information on cooling facilities, and positions of the cooling facilities are stored as arrangement information. The pieces of working information on the workloads are estimated, and allocation of tentative workloads is deduced for fear the pieces of working information may exceed the performances of a group of information processing devices. Tentative power consumptions and arrangement information resulting from the allocation of the tentative workloads, and tentative power consumptions and arrangement information necessary for the allocation of the tentative workloads are calculated. Tentative cooling powers required to control the cooling facilities are calculated. Allocation of the tentative workloads minimizing the sum total of the tentative power consumptions of the information processing devices and the tentative cooling powers of the cooling facilities is searched. Based on the searched allocation, the workloads are allocated to the information processing devices.

15 Claims, 13 Drawing Sheets

(51) Int. Cl.
*G06F 9/50* (2006.01)
*G06F 3/06* (2006.01)
*H04L 29/08* (2006.01)
*G06F 9/455* (2006.01)

(56) References Cited

U.S. PATENT DOCUMENTS

| | | |
|---|---|---|
| 8,321,871 B1 | 11/2012 | Jackson |
| 8,539,059 B2 * | 9/2013 | Parolini et al. ............ 709/223 |
| 2006/0259621 A1 | 11/2006 | Ranganathan et al. |
| 2006/0259793 A1 | 11/2006 | Moore et al. |
| 2007/0180117 A1 | 8/2007 | Matsumoto et al. |
| 2009/0259345 A1 | 10/2009 | Kato et al. |
| 2009/0265568 A1 | 10/2009 | Jackson |
| 2009/0282273 A1 * | 11/2009 | Hamilton, II ......... G06F 1/3203 713/320 |
| 2009/0327778 A1 | 12/2009 | Shiga et al. |
| 2010/0083020 A1 | 4/2010 | Suzuki |
| 2010/0180275 A1 | 7/2010 | Neogi et al. |
| 2011/0019531 A1 | 1/2011 | Kim et al. |
| 2011/0099403 A1 | 4/2011 | Miyata et al. |
| 2011/0126206 A1 | 5/2011 | Kato et al. |

FOREIGN PATENT DOCUMENTS

| | | |
|---|---|---|
| CN | 102099790 A | 6/2011 |
| JP | 2004-126968 A | 4/2004 |
| JP | 2009-252056 A | 10/2009 |

OTHER PUBLICATIONS

Extended European Search Report issued in counterpart European Application No. 12177310.5 dated May 24, 2016 (ten (10) pages).

* cited by examiner

FIG. 11

| DEVICE NAME | RESOURCE TYPE | RESOURCE VOLUME |
|---|---|---|
| PHYSICAL SERVER 330 | NUMBER OF CPU CORES | 4 Core |
| | CPU OPERATING FREQUENCY | 2.93 GHz |
| | MEMORY CAPACITY | 8 GB |
| | NIC BANDWIDTH | 1 Gbps |
| | HBA BANDWIDTH | 1 Gbps |
| | .. | .. |
| PHYSICAL SERVER 331 | NUMBER OF CPU CORES | 4 Core |
| | CPU OPERATING FREQUENCY | 2.93 GHz |
| | MEMORY CAPACITY | 8 GB |
| | NIC BANDWIDTH | 1 Gbps |
| | HBA BANDWIDTH | 1 Gbps |
| | .. | .. |
| PHYSICAL SERVER 332 | NUMBER OF CPU CORES | 2 Core |
| | CPU OPERATING FREQUENCY | 2.93 GHz |
| | MEMORY CAPACITY | 4 GB |
| | NIC BANDWIDTH | 1 Gbps |
| | HBA BANDWIDTH | 1 Gbps |
| | .. | .. |
| PHYSICAL SERVER 333 | NUMBER OF CPU CORES | 8 Core |
| | CPU OPERATING FREQUENCY | 2.93 GHz |
| | MEMORY CAPACITY | 32 GB |
| | NIC BANDWIDTH | 10 Gbps |
| | HBA BANDWIDTH | 1 Gbps |
| | .. | .. |

| DEVICE NAME | RESOURCE TYPE | RESOURCE VOLUME |
|---|---|---|
| ROUTER 310 | NIC BANDWIDTH | 1 Gbps/10 Gbps |
| ROUTER 311 | NIC BANDWIDTH | 1 Gbps/10 Gbps |
| SWITCH 320 | NIC BANDWIDTH | 1 Gbps |
| SWITCH 321 | NIC BANDWIDTH | 1 Gbps/10 Gbps |
| SWITCH 322 | NIC BANDWIDTH | 1 Gbps |
| SWITCH 323 | NIC BANDWIDTH | 1 Gbps |

| DEVICE NAME | RESOURCE TYPE | RESOURCE VOLUME |
|---|---|---|
| FC SWITCH 340 | HBA BANDWIDTH | 1 Gbps |
| FC SWITCH 341 | HBA BANDWIDTH | 10 Gbps |

| DEVICE NAME | RESOURCE TYPE | RESOURCE VOLUME |
|---|---|---|
| STORAGE 350 | HBA BANDWIDTH | 1 Gbps |
| | CAPACITY | 10 TB |
| STORAGE 351 | HBA BANDWIDTH | 1 Gbps |
| | CAPACITY | 10 TB |

FIG. 12

| DEVICE NAME (CONNECTION SOURCE) | DEVICE NAME (CONNECTION DESTINATION) | DEVICE NAME (CONNECTION SOURCE) | DEVICE NAME (CONNECTION DESTINATION) | DEVICE NAME (CONNECTION SOURCE) | DEVICE NAME (CONNECTION DESTINATION) |
|---|---|---|---|---|---|
| PHYSICAL SERVER 330 | SWITCH 320 | PHYSICAL SERVER 330 | FC SWITCH 340 | SWITCH 320 | SWITCH 310 |
| PHYSICAL SERVER 331 | SWITCH 320 | PHYSICAL SERVER 331 | FC SWITCH 340 | SWITCH 321 | SWITCH 310 |
| PHYSICAL SERVER 332 | SWITCH 321 | PHYSICAL SERVER 332 | FC SWITCH 340 | SWITCH 322 | SWITCH 311 |
| PHYSICAL SERVER 333 | SWITCH 321 | PHYSICAL SERVER 333 | FC SWITCH 340 | SWITCH 323 | SWITCH 311 |
| PHYSICAL SERVER 334 | SWITCH 322 | PHYSICAL SERVER 334 | FC SWITCH 341 | SWITCH 310 | ROUTER 300 |
| PHYSICAL SERVER 335 | SWITCH 322 | PHYSICAL SERVER 335 | FC SWITCH 341 | SWITCH 311 | ROUTER 300 |
| PHYSICAL SERVER 336 | SWITCH 323 | PHYSICAL SERVER 336 | FC SWITCH 341 | FC SWITCH 340 | STORAGE 350 |
| PHYSICAL SERVER 337 | SWITCH 323 | PHYSICAL SERVER 337 | FC SWITCH 341 | FC SWITCH 341 | STORAGE 351 |

FIG. 13

| VIRTUAL MACHINE | RESOURCE TYPE | T1-T2 | T2-T3 | T3-T4 | T4-T5 | T5-T6 |
|---|---|---|---|---|---|---|
| VM1 | CPU WORKING RATIO | 80% (4 Core) | 20% (4 Core) | 20% (4 Core) | 40% (4 Core) | 40% (4 Core) |
| | MEMORY USAGE | 0.8 GB | 0.8 GB | 7.0 GB | 0.8 GB | 0.8 GB |
| | NETWORK ACCESS BANDWIDTH | 0.1 Gbps | 0.1 Gbps | 0.1 Gbps | 0.1 Gbps | 0.1 Gbps |
| | NETWORK ACCESS COMMUNICATION DESTINATION | VM4 | VM4 | VM4 | VM4 | VM4 |
| | STORAGE ACCESS BANDWIDTH | 0.2 Gbps | 0.2 Gbps | 0.2 Gbps | 0.2 Gbps | 0.2 Gbps |
| | PHYSICAL SERVER | SERVER 330 | SERVER 333 | SERVER 330 | SERVER 330 | SERVER 330 |
| VM2 | CPU WORKING RATIO | 70% (4 Core) | 20% (4 Core) | 20% (4 Core) | 40% (4 Core) | 70% (4 Core) |
| | MEMORY USAGE | 0.8 GB | 0.8 GB | 7.0 GB | 0.8 GB | 0.8 GB |
| | NETWORK ACCESS BANDWIDTH | 0.7 Gbps | 0.3 Gbps | 0.3 Gbps | 0.7 Gbps | 0.7 Gbps |
| | NETWORK ACCESS COMMUNICATION DESTINATION | VM4 | VM4 | VM4 | VM4 | VM4 |
| | STORAGE ACCESS BANDWIDTH | 0.2 Gbps | 0.2 Gbps | 0.2 Gbps | 0.2 Gbps | 0.2 Gbps |
| | PHYSICAL SERVER | SERVER 331 | SERVER 333 | SERVER 331 | SERVER 330 | SERVER 331 |
| VM3 | CPU WORKING RATIO | 60% (2 Core) | 20% (2 Core) | 20% (2 Core) | 70% (2 Core) | 40% (2 Core) |
| | MEMORY USAGE | 0.8 GB | 0.8 GB | 3.0 GB | 0.8 GB | 0.8 GB |
| | NETWORK ACCESS BANDWIDTH | 0.7 Gbps | 0.3 Gbps | 0.3 Gbps | 0.7 Gbps | 0.7 Gbps |
| | NETWORK ACCESS COMMUNICATION DESTINATION | VM4 | VM4 | VM4 | VM4 | VM4 |
| | STORAGE ACCESS BANDWIDTH | 0.2 Gbps | 0.2 Gbps | 0.2 Gbps | 0.2 Gbps | 0.2 Gbps |
| | PHYSICAL SERVER | SERVER 332 | SERVER 333 | SERVER 332 | SERVER 332 | SERVER 332 |
| VM4 | CPU WORKING RATIO | 70% (8 Core) | 20% (8 Core) | 20% (8 Core) | 70% (8 Core) | 70% (8 Core) |
| | MEMORY USAGE | 10 GB | 10 GB | 10 GB | 10 GB | 10 GB |
| | NETWORK ACCESS BANDWIDTH | 1.4 Gbps | 0.7 Gbps | 0.7 Gbps | 1.4 Gbps | 1.4 Gbps |
| | NETWORK ACCESS COMMUNICATION DESTINATION | VM1/VM2/VM3 | VM1/VM2/VM3 | VM1/VM2/VM3 | VM1/VM2/VM3 | VM1/VM2/VM3 |
| | STORAGE ACCESS BANDWIDTH | 0.2 Gbps | 0.2 Gbps | 0.2 Gbps | 0.2 Gbps | 0.2 Gbps |
| | PHYSICAL SERVER | SERVER 333 | SERVER 333 | SERVER 333 | SERVER 333 | SERVER 333 |

INFORMATION PROCESSING SYSTEM, AND ITS POWER-SAVING CONTROL METHOD AND DEVICE

CLAIM OF PRIORITY

The present application claims priority from Japanese patent application JP 2011-235537 filed on Oct. 27, 2011, the content of which is hereby incorporated by reference into this application.

FIELD OF THE INVENTION

The present invention relates to operational management of an information processing system, or more particularly, to a preferred technology for comprehensively managing power-saving operation of a group of information processing devices and facilities.

BACKGROUND OF THE INVENTION

In recent years, operational management of an information processing system including a group of information processing devices such as servers, storages, and network devices, and facilities that feed power to the group of information processing devices or cool the group of information processing devices, or more particularly, a comprehensive power-saving operational management technology for the group of information processing devices and facilities has attracted attention. This is attributable to the fact that: the number of information processing devices is increasing along with fast exploitation of information communication and with the advent of the age of fusion of broadcast and communication; and there is an impending necessity of greatly reducing power consumptions of the information processing devices so as to diminish carbon dioxide for the purpose of preventing global warming.

For example, patent document 1 (Japanese Unexamined Patent Application Publication No. 2004-126968) describes that a management server which performs job scheduling for parallel computers assigns a new job to a computer, the temperature of which is low, on the basis of computer temperature sensor information of the computer, moves a job from a computer, the temperature of which is high, to the computer whose temperature is low, and thus prevents a fault or degradation of performance from occurring in the parallel computers due to high temperature. Before and after a job is moved, the power consumptions of computers and cooling devices associated with the computers are estimated based on pieces of temperature information. Thus, whether the job can be moved is decided.

Patent document 2 (US2007/0180117) describes that a management system for plural computers samples an overheated computer and a non-overheated computer on the basis of a temperature distribution among the computers and pieces of working information, moves software from the former to the latter, and thus saves power. In addition, after object computers are sampled, a variation in a power of each of the computers between before and after the software is moved is compared with a variation in an air-conditioning power in order to decide whether the movement can be made. The computer power is obtained from the working information, the air-conditioning power is obtained from the temperature distribution, and the temperature distribution is obtained using a temperature sensor, a temperature history, or the working information.

Patent document 3 (U.S. Patent Application No. 2006-0259621) describes a method of allocating workloads to plural servers existent in a data center. Herein, a profile of a requested workload is compared with a history profile, and the requested workload is allocated to a server according to a history signifying that the powers of the server and an air conditioner are the minimum. If the matched history is absent, the workload is allocated at random. The history profile specifies a position of a server, a class, working information, intake air temperature, exhaust temperature, type of workload, power required by the server, and power required by the air conditioner. The powers of the server and air conditioner are obtained based on the intake air temperature and exhaust temperature of the server, a specific heat, and an air volume, or measured using a power meter.

Patent document 4 (U.S. Patent Application No. 2006-0259793) describes a method for distributing power to plural servers existent in a data center. Herein, a power budget is lent or borrowed between servers or racks, geographical positions of which are close to each other, so that a temperature distribution, that is, a power distribution can approach an ideal analog distribution. Decentralized powers of servers are designated based on the budget allotment, whereby a fault of a server is prevented from occurring due to a hot spot or cold spot. A heat multiplier indicating an ideal power for each server is obtained based on the exhaust temperature of the server, a reference exhaust temperature of an average server, and an intake air temperature of an air conditioner.

Patent document 5 (US2009/0259345) describes that power saving of a group of information processing devices is feasible by concentrating workloads on a specific device, and suspending or stopping the other devices, while power saving of air-conditioning facilities is feasible by decentralizing the powers of the group of devices so as to improve running efficiency. When such contradictory requirements have to be satisfied, there are provided an operational management method and operational management device that minimize or optimize a total power required by the group of devices and facilities. Specifically, in order to realize minimization of the powers of the group of information processing device and air-conditioning facilities in comprehensive consideration of a power distribution or variation and arrangement relative to the air-conditioning facilities, the variation among the workloads or any other situation is monitored, and the workloads are arranged on the group of devices in an appropriately intensive and decentralized manner according to the situation.

SUMMARY OF THE INVENTION

Along with a recent fast exploitation of information communication and along with the advent of the age of fusion of broadcast and communication, the number of information processing devices is expected to explosively increase. In contrast, there is an impending necessity of greatly reducing the power consumptions of the information processing devices so as to diminish carbon dioxide for the purpose of preventing global warming. In particular, in a data center that supports the base of information processing, in addition to the powers to be consumed by a group of information processing devices, powers to be consumed by facilities that feed power or cool the information processing devices occupies a large ratio. Reduction of a total power required by the group of devices and facilities has come to be a serious challenge.

For power saving of a data center, attempts have been made for information processing devices including servers, storages, and networks, power feeding facilities, cooling facilities, and operational management of a system respectively. For the information processing devices, performance per power consumption of a low-power device or circuit is improved, and adoption of a power-saving feature that switches an activity mode and standby mode according to a workload is encouraged. For the power feeding facilities, a loss occurring in a power feeding system extending to power supplies of a group of devices through a transformer, an uninterruptible power supply, a distribution board, and a distributor is decreased, or conversion efficiency is improved. For the cooling facilities, running efficiency of an air conditioner itself is improved, or an airflow design of an air intake port or exhaust vent is optimized. Further, topical cooling or liquid cooling has been introduced. For operational management, monitoring of working information, job scheduling, improvement of operational efficiency of the group of devices through virtualization, and consolidation are performed as major measurements.

The power feeding facilities and cooling facilities are generally designed based on maximum rated powers for the group of devices. Efficiency of the facilities being operated or powers required thereby greatly depend on a distribution of powers of the group of devices relative to the facilities or a variation among the powers. For example, since power supply conversion efficiency depends on a power load, a power feeding loss varies depending on an operating power of the device and a power feeding system. The efficiencies of air conditioners depend on the powers of the devices, that is, heat dissipation, a positional relationship among the air conditioners and the devices, distances of the air conditioners, temperatures thereof, air volumes, or wind directions. Cooling powers are largely affected by the powers of the devices and the arrangement thereof.

Operational management through virtualization of a data center is expected to develop, and consolidation or live migration is expected to be utilized for power saving. It is therefore necessary to take account of imbalance of a power distribution among the group of devices relative to the facilities or a temporal variation among them, and to reduce a total power required by the group of devices and facilities. In the past, some methods have been known as an operational management method for the temperatures of the group of devices including servers and computers, and cooling facilities or air-conditioning facilities, or for a power required thereby. In terms of the foregoing comprehensive power saving, regional or sequential measures have merely been taken.

For example, according to the patent document 1, a temperature rise in a computer is suppressed by assigning a job to a computer, the temperature of which is low, among parallel computers. In a case where diverse information processing devices coexist, like, in a data center, a device whose temperature is low does not always contribute to power saving. The power consumption of the computer is estimated before and after the job is moved. Therefore, although a power of a source and a power of a destination are decreased, it is merely localized power saving for the whole of the parallel computers. The estimate includes a power of a cooling unit included in each computer. No consideration is taken into arrangement of the air-conditioning facilities and computers. Even if the powers of the computers and cooling units are decreased, the powers of the air-conditioning facilities may be increased and a total power may be increased, though it depends on a way of assigning the job.

According to the patent document 2, software is moved from an overheated computer to a non-overheated computer. However, a computer whose temperature is low does not always require a small power. For an entire group of computers, when software is concentrated on a specific computer and the other computers are stood by or suspended, power saving is achieved. A variation in the power of the computer between before and after the software is moved is compared with a variation in an air-conditioning power. However, entities to be compared with each other are limited to the overheated and non-overheated computers. A total power including powers of air-conditioning facilities is not taken into consideration.

According to the patent document 3, workloads requested based on a history profile which specifies the smallest powers of servers and air-conditioning facilities is allocated to the servers. For a new request that can be met within the history, the powers of the group of servers and air-conditioning facilities can be reduced. However, when a history that can be referenced is absent or when already allocated workloads largely vary, nothing can be performed, or the situation is sequentially improved according to accumulation of history data. Although the history profile specifies the positions of the servers, the powers of the air-conditioning facilities are obtained based on the intake air temperatures and exhaust temperatures of the servers or using a power meter. The positional relationships among the servers and air-conditioning facilities are not taken into consideration. Allocation of workloads to servers whose positions are found in a history does not always minimize the total power required by the group of servers and air-conditioning facilities.

According to the patent document 4, a power budget is lent or borrowed between adjoining servers so that a temperature distribution can be approached to an ideal one, but a total power required by an entire group of servers is not reduced. For the purpose of equalizing temperatures, powers are macroscopically dispersed among the group of servers. This contradicts power saving through consolidation of the servers. For power distribution, the geographical positions of the servers, the exhaust temperatures thereof, and the intake air temperatures of air-conditioning facilities are referenced. However, the powers of the air-conditioning facilities and the arrangement thereof are not taken into consideration. The power distribution does not contribute to reduction of the powers of the air-conditioning facilities. A power mode designated for the servers falls into a standby mode (standby power) and a maximum activity mode (maximum power). A variation in a power dependent on a workload is not taken into consideration, and the power-saving features of the servers themselves are not utilized.

According to the patent document 5, power saving of a group of information processing devices is feasible by concentrating workloads on a specific device, and suspending or stopping the other devices. Power saving of air-conditioning facilities is feasible by decentralizing powers of the group of devices so as to improve running efficiency. Thus, when such contradictory requests have to be met, there are provided an operational management method and operational management device that, in order to reduce the powers of the group of information processing devices and air-conditioning facilities in comprehensive consideration of a power distribution or variation and arrangement relative to the air-conditioning facilities, monitor a variation among workloads or any other situation, arrange workloads on the group of devices in an appropriately intensive and decentralized manner according to the situation, and optimize or minimize a total power required by the group of devices and facilities. However, no consideration is taken into power consumptions necessary for processing of rearranging the workloads. When the air-conditioning facilities are controlled, it is necessary to set the air-conditioning facilities to low temperatures to which margins equivalent to the power consumptions necessary for the workload reallocation processing are added. In other words, there is still room for power saving.

As mentioned above, the related arts merely locally or sequentially reduce powers of a group of information processing devices and air-conditioning facilities.

An object of the present invention is to provide a control method and device for an information processing system that reduce a total power, which is required by a group of devices and facilities, in comprehensive consideration of a power distribution or variation among the group of devices and arrangement relative to the facilities, and that realize the power-saving operation of the information processing system.

In order to accomplish the above object, according to the present invention, there is provided a power-saving control method for an information processing system including a group of information processing devices that has plural types of information processing devices interconnected, cooling facilities that cool the group of information processing devices. Pieces of working information on workloads in the group of information processing devices, positions of the workloads, pieces of environmental information on the cooling facilities, and positions of the cooling facilities are regarded as arrangement information. The pieces of working information on the workloads, which are executed in the group of information processing devices, for a certain period of time from predetermined timing are estimated. Allocation of tentative workloads to the group of information processing devices is deduced from the estimated pieces of working information on the workloads for fear the pieces of working information may exceed the performances of the group of information processing devices, to which the workloads are allocated, for the certain period of time. Tentative power consumptions and arrangement information resulting from the allocation of tentative workloads to the group of information processing devices, and tentative power consumptions and arrangement information necessary for the allocation of the tentative workloads to the group of information processing devices are calculated. Based on the results of the calculation, tentative cooling powers required to control the cooling facilities are calculated. Optimal allocation of the tentative workloads to the group of information processing devices which minimizes the sum total of the tentative power consumptions of the group of information processing devices and the tentative cooling powers of the cooling facilities is searched. At the predetermined timing, based on the searched optimal allocation of the tentative workloads, the workloads are allocated to the group of information processing devices, and the cooling facilities are controlled in relation to actual power consumptions necessary for the actual allocation of the workloads.

In order to accomplish the aforesaid object, according to the present invention, there is provided an information processing system including a group of information processing devices having plural types of information processing devices interconnected, facilities for cooling the group of information processing devices, and an operational management device. The operational management device includes a processing unit and a memory unit. In the memory unit, pieces of working information on workloads in the group of information processing devices, positions of the workloads, pieces of environmental information on the cooling facilities, and positions of the cooling facilities are stored as arrangement information. The processing unit estimates the pieces of working information on the workloads, which are executed in the group of information processing devices, for a certain period of time, and deduces allocation of tentative workload to the group of information processing devices from the estimated pieces of working information for fear the pieces of working information may exceed the performances of the group of information processing devices, to which the workloads are allocated, for the certain period of time. The processing unit then calculates tentative power consumptions and arrangement information resulting from the allocation of tentative workloads to the group of information processing devices, and tentative power consumptions and arrangement information necessary for the allocation of the tentative workloads to the group of information processing devices, and calculates tentative cooling powers required to control the facilities on the basis of the results of the calculation. The processing unit then searches optimal allocation of the tentative workloads which minimizes the sum total of the tentative power consumptions of the group of information processing devices and the tentative cooling powers of the facilities for the certain period of time. At the predetermined timing, based on the searched optimal allocation of the tentative workloads, the processing unit allocates the workloads to the group of information processing devices, and controls the facilities in relation to actual power consumptions necessary for the actual allocation of the workloads.

In order to accomplish the aforesaid object, according to the present invention, there is provided an operational management device that manages the operation of a group of information processing devices having plural types of information processing devices interconnected, and of facilities which control the temperatures of the group of information processing devices. The operational management device includes a processing unit and a memory unit. In the memory unit, pieces of working information on workloads in the group of information processing devices, positions of the workloads, pieces of environmental information on facilities, and positions of the facilities are stored as arrangement information. The processing unit estimates the pieces of working information on the workloads, which are executed in the group of information processing devices, for a certain period of time, and deduces allocation of tentative workloads to the group of information processing devices from the estimated pieces of working information for fear the pieces of working information may exceed the performances of the group of information processing devices, to which the workloads are allocated, for the certain period of time. The processing unit then calculates tentative power consumptions and arrangement information resulting from the allocation of tentative workloads, and tentative power consumptions and arrangement information necessary for the allocation of the tentative workloads to the group of information processing devices, and calculates tentative power consumptions required to control the facilities on the basis of the results of the calculation. The processing unit then searches optimal allocation of the tentative workloads to the group of information processing devices which minimize the sum total of the tentative power consumptions of the group of information processing devices and the tentative power consumptions of the facilities for the certain period of time, allocates the workloads to the group of information processing devices on the basis of the searched optimal allocation of the tentative workloads, and controls the facilities in relation to actual power consumptions necessary for the actual allocation of the workloads.

A feature of a typical embodiment of the present invention is inclusion of a unit that has arrangement information containing positions of the group of information processing devices, pieces of working information on the group of information processing devices, positions of the facilities, and pieces of environmental information on the facilities, and obtains power consumptions for workloads of the group of devices on the basis of the pieces of working information, and a unit that obtains power-feeding losses or cooling powers of the facilities in relation to the power consumptions of the group of devices on the basis of the arrangement information. Thus, workloads are allocated in order to minimize a total power required by a group of information processing devices and facilities.

The positions of the group of devices and pieces of working information thereon are acquired by grasping the positions of the entire group of devices and workloads but not by sampling overheated and non-overheated devices. The working information shall be information needed to calculate a power consumption required when a workload is moved from a certain device to another device, and shall, if necessary, contain specification information or configuration information on the device. As for the positions of the facilities and pieces of environmental information thereon, if the facility is a power feeding facility, the position of the facility and environmental information thereon are acquired in order to grasp a power-feeding loss occurring in a power feeding system that extends from a transformer to a device power supply. If the facility is a cooling facility, the position of the facility and environmental information thereon are acquired in order to grasp a heat exchange cycle, in which external air reaches a device, that is, a heat source via air or a refrigerant, and a cooling power. The environmental information is not only acquired by a built-in sensor of the facility or an external sensor but also obtained from, if necessary, the working information on the device.

The unit that obtains device powers obtains the powers, which vary depending on whether the workloads of the entire group of devices are small or large in volume, on the basis of the pieces of working information, but does not obtain the powers on the basis of pieces of temperature information or by referencing a history. What are obtained by the unit are not powers fixed for a maximum activity mode or standby mode. The devices are not limited to overheated and non-overheated devices. The unit that obtains facility powers obtains the powers of all the facilities, which vary depending on a power distribution or variation among the group of devices, on the basis of information on arrangement of the facilities relative to the group of devices, but does not obtain the powers on the basis of a temperature distribution or by referencing a history. What are obtained by the unit are not powers of cooling units included in the devices. The unit that allocates workloads to the group of devices allocates the workloads on the basis of an optimal solution obtained with the entire group of devices regarded as objects. At this time, the objects are not limited to devices whose temperatures are low, overheated devices, devices that are gone down in a history, or devices whose geometrical positions are close to each other.

Another aspect of the present invention is inclusion of a unit which monitors arrangement information including positions of a group of devices, pieces of working information on the group of devices, positions of facilities, and pieces of environmental information on the facilities, and allocates tentative workloads to the group of devices on the basis of current or scheduled workloads, a unit that obtains tentative power consumptions for the tentative workloads of the group of devices on the basis of workloads, which are replaced with the tentative workloads to be allocated, and pieces of working information, and a unit that obtains tentative power-feeding losses or tentative cooling powers of the facilities on the basis of the arrangement information and the tentative power consumptions. Thus, an optimal solution of allocation of the tentative workloads which minimizes the sum total of the tentative power consumptions of the group of devices and the tentative power-feeding losses or tentative cooling powers of the facilities is obtained.

The allocation of workloads to the group of devices includes allocations of numerical combinations of workloads. A solution of the allocation that minimizes a total power required by the group of devices and facilities is searched by allocating tentative workloads. Thus, the optimal solution can be efficiently found, and the workloads are actually allocated to the group of devices on the basis of the optimal solution. Allocation of the tentative workloads may be applied not only to current workloads but also to scheduled or estimated workloads. As for the search for the solution, consideration should be taken into constraints such as a condition of operating temperatures or permissible loads of the devices, a condition of permissible powers of distribution boards of power feeding facilities or rack power supplies, a condition of cooling capabilities of cooling facilities, and a condition for a segmental permissible power intended to avoid creation of a heat pool.

Still another aspect of the present invention is inclusion of arrangement information into which positional coordinates of a group of devices in a space in which the group of devices and facilities are installed, pieces of working information on the group of devices, positional coordinates of the facilities, and pieces of environmental information concerning power feeding or cooling are mapped. The working situations of the group of devices and facilities in an actual space, and the arranged state thereof are reproduced in a virtual space, whereby allocation of workloads to the group of devices and simulation of running of the facilities are performed in the common virtual space. Thus, operational management having the group of devices and facilities closely linked with one another is implemented. In addition, the virtual space is visualized so that monitoring of workings of the group of devices and facilities, job coordination, fault sensing, asset management, and power management can be collectively and efficiently achieved.

Still another aspect of the present invention is employment of a device power function that provides a power consumption for a workload of each of devices on the basis of specification information on the device, configuration information, measurement information, working information, or a working history. Thus, the device power can be readily obtained according to allocation of a workload, changing thereof, or movement thereof. For example, assuming that a function $l_{jk}(t)$ (k=1, 2, etc.) having a time t as an argument expresses a workload which varies with the passage of time, a device power function $P_{Di}$ (i=1, 2, etc.) for a device i is expressed as a formula (1) below.

$$p_{Di}=p_{Di}(l_{j1}(t),l_{j2}(t),\ldots)=p_{Di}(\vec{l}_j(t))\ (i=1,2,\ldots) \quad (1)$$

where $\vec{T}_j(t)$ denotes allocation of a workload to any of the group of devices (j=1, 2, etc.).

A sum total of all device powers is expressed as a formula (2) below.

$$P_D = \Sigma_i p_{Di}(\vec{T}_j(t)) \quad (2)$$

When a workload is present (a device is in action), the device power function $p_{Di}$ is realized with a multi-variable linear function or non-linear function. When the workload is absent (the device is suspended or stopped), the device function is realized with a discontinuous function that gives a power value. The device power function $p_{Di}$ may provide a return value retrieved from a numerical table with respect to a variable or may express interpolation.

For example, as the device power function $p_{Di}$, an appropriate function is adopted according to available information or required calculation precision. If a maximum rated power can be deduced from specification information on a device or configuration information thereon, a step function relating to the on or off state of the device may be adopted. If a maximum power and standby power is learnt, a linear function expressed with a slope and an intercept may be adopted. If any of plural activity modes, a standby mode, a suspension mode, or a stoppage mode is identified as working information, a set of conditional functions may be adopted. If the power consumption of the device can be monitored, a quadratic function fitted to working history data may be adopted. For brevity's sake, a set of variables in the formula (1) which expresses allocation of workloads to the group of devices may be consolidated to a major factor that affects powers. For example, if the devices are servers, the major factor is a maximum performance of a processor, a use rate, an activity-mode parameter (frequency or voltage), or the like. If the devices are storages, the major factor is the number of active disks, an access pattern, an access time, or the like. If the devices are network devices, the major factor is a transfer throughput, a switching frequency, or the like.

Still another aspect of the present invention is such that when allocation of workloads to a group of devices is changed, allocation of a workload to any of the group of devices is expressed as a formula (3) below using a substitution function δk.

$$\delta_k(\vec{T}_j(t)) \quad (3)$$

When arrangement of a workload indicated with allocation in the formula (1) is shifted to arrangement of a workload indicated with allocation of the formula (3), a cost of migration processing is imposed as a new workload on devices involved in the shift. As the cost of migration processing that is the new workload, when a workload $l_{jk}$ allocated to a device m is moved to a device n, the new workload refers to a work of transferring work data, which exists in a memory or storage and is needed to execute the workload $l_{jk}$, from the device m to the device n over a network or the like. The new workload is additionally allocated to the device m, device n, and other devices involved in the transfer. Allocation of workloads including the newly added workload is expressed as a formula (4) below. A time required to complete the newly added workload is expressed as a formula (5) below.

$$\vec{L}_{MI}(\vec{l}_j, \delta_k(\vec{l}_j)) \quad (4)$$

$$T_{MI}(\vec{L}_{MI}(\vec{l}_j, \delta_k(\vec{l}_j))) \quad (5)$$

Still another aspect of the present invention is employment of a facility power function which provides a power-feeding loss or cooling power, which is caused or required by facilities, in relation to power consumptions of devices, positions of the devices, pieces of environmental information on the facilities, and positions of the facilities. Thus, the power required by the facilities can be readily obtained according to a power distribution among the devices due to allocation of workloads. For example, assuming that $p_{di}$ denotes a power of a device i, xi (xi, yi, zi) denotes the position of the device, $\epsilon_\iota$ denotes environmental information on a facility ι (ι=1, 2, etc.), and xι (xι, yι, zι) denotes the position of the facility, a power-feeding loss function $p_s$ and cooling power function $p_c$ are expressed as formulae (6) and (7) respectively below.

$$p_s = p_s(p_{D1}, x_1), (p_{D2}, x_2), \ldots, (\epsilon_1, \chi_1), (\epsilon_2, \chi_2), \ldots) \quad (6)$$

$$p_c = p_c((p_{D1}, x_1), (p_{D2}, x_2), \ldots, (\epsilon_1, \chi_1), (\epsilon_2, \chi_2), \ldots) \quad (7)$$

As for the power-feeding loss function $p_s$, a power feeding system extending from a transformer, uninterruptible power source, distribution board, or distributor to a device power supply is obtained based on positions of devices, pieces of environmental information on power feeding facilities, and the positions of the power feeding facilities. Power-supply efficiencies or distribution losses for device powers, that is, power loads are calculated along the power feeding system. A power-feeding loss caused by all the power feeding facilities is eventually calculated. As for the cooling power function pc, thermal fluid simulation for a room, in which a group of devices is installed, and heat exchange simulation for a cooling system, which extends from an indoor cooling machine such as a refrigerating machine to an outdoor machine such as a cooling tower, are performed based on the positions of devices, powers of the devices (heat source distribution), pieces of environmental information on cooling facilities, and positions of the cooling facilities. A cooling power required by all the cooling facilities is eventually calculated.

For a position xi of a device, aside from three-dimensional coordinates, any expression with which a three-dimensional position can be identified, such as, a two-dimensional position of a rack on which the device is mounted, and a number in a height direction of the rack, or a two-dimensional position of a floor tile on which the device is installed, and a height from the tile can be substituted. The environmental information $\epsilon i$ on a power feeding facility may be a power load characteristic of a power supply, distributor, or wiring, or an input/output power to be monitored in a device or rack. The environmental information $\epsilon i$ on a cooling facility may be the temperature or humidity of air or a refrigerant, a flow rate, a flow velocity, a flow direction thereof, the operating temperature of a device, the intake air or exhaust temperature at a rack or an intake port or exhaust vent, the intake or exhaust temperature of an indoor machine or outdoor machine, a flow rate thereof, the temperature or humidity of external air, or a thermal load characteristic of a device. The positional information xι on the facility may include, in addition to a three-dimensional position, topological connection information such as a distance of a device to a destination.

Still another aspect of the present invention is such that a combination optimization problem is readily solved by approximately decomposing a facility power function, which relates to powers of a group of devices, positions of the devices, pieces of environmental information on facilities, and positions of the facilities, into element functions which express facility powers necessary for the respective devices. A sum of a device power function and a facility element function is defined as a device function for each device. A value of an objective function can therefore be shortly calculated for allocation of a workload. For example, element functions $p_{si}$ and $p_{ci}$ providing a power-feeding loss and cooling power relevant to a device I are expressed as formulae (8) and (9) below. Incidentally, the element functions $p_{si}$ and $p_{ci}$ are functions of environmental information $\varepsilon\iota$ on a facility and a position $x\iota$ thereof. Herein, the element functions $p_{si}$ and $p_{ci}$ are expressed simply.

$$p_{Si} = p_{Si}(p_{Di}, x_i) \qquad (8)$$

$$p_{Ci} = p_{Ci}(p_{Di}, x_i) \qquad (9)$$

The facility power functions $p_{Si}$ and $p_{Ci}$ are, as expressed as the formulae (6) and (7), functions relating to all of a group of devices and facilities. As long as a power distribution among the group of devices, pieces of environmental information on the facilities, and the positions of the facilities do not largely vary or are not extremely unbalanced, the facility power functions $p_{Si}$ and $p_{Ci}$ may be thought to be separated into facility element functions $p_{Si}$ and $p_{Ci}$ for devices through approximation of interaction or nonlinear action. Otherwise, the facility element functions may be modified so that interaction between relatively adjoining devices can be incorporated into the functions. The device function $p_i$ is a sum of the facility element functions $p_{Si}$ and $p_{Ci}$ nd device power function $p_{Di}$, and expressed as a formula (10) below. The objective function P is a sum total of the device functions $p_i$ for the entire group of devices, and expressed as a formula (11) below.

$$p_i = p_{Di} + p_{Si} + p_{Ci} = p_{Di}(\vec{l}_j(t)) + p_{Si}(p_{Di}(\vec{l}_j(t))) + p_{Ci}(p_{Di}(\vec{l}_j(t))) \qquad (10)$$

$$p = \Sigma_i p_i(\vec{l}_j(t)) \qquad (11)$$

Still another aspect of the present invention is such that a combination optimization problem for allocating workloads to devices is defined by regarding a total power P, which is a sum total of device powers and facility powers required for a designated time, as an objective function, and an optimal solution that minimizes the objective function or a feasible approximate solution close to the optimal solution is obtained. For example, the device power required during a period from a time $T_{n+1}$ to a time $T_n$ is expressed as a formula (12), and the facility power is expressed as a formula (13) below.

$$P_{Di} = \int_{T_{n-1}}^{T_n} \Sigma_i p_{Di}(\vec{l}_j(t)) dt \qquad (12)$$

$$P_S + P_C = \int_{T_{n-1}}^{T_n} \Sigma_i (p_{Di}(\vec{l}_j(t))) + p_C(p_{Di}(\vec{l}_j(t)))) dt \qquad (13)$$

Assuming that arrangement of workloads specified in formula (1) is shifted to arrangement of workloads expressed by formula (3) at the time $T_n$, a workload described in formula (4) is generated. A completion time of the workload is expressed based on formula (5) as formula (14) below.

$$T_n + T_{MI}(\vec{L_{MI}}(\vec{l}_j, \delta_k(\vec{l}_j))) \qquad (14)$$

A total power P required from the time $T_{n+1}$ to a time $T_n+_1$ is expressed as formula (15) or formula (16) below.

$$P = \int_{T_{n-1}}^{T_n} \sum_i \left( p_{Di}(\vec{l}_j(t)) + p_{Si}(p_{Di}(\vec{l}_j(t))) + p_{Ci}(p_{Di}(\vec{l}_j(t))) \right) dt + \qquad (15)$$

$$\int_{T_n}^{T_n + T_{MI}(\vec{L_{MI}}(\vec{l}_j, \delta_k(\vec{l}_j)))} \sum_i \left( p_{Di}(\vec{L_{MI}}(\vec{l}_j, \delta_k(\vec{l}_j))) \right) + $$

$$p_{Si}(p_{Di}(\vec{L_{MI}}(\vec{l}_j, \delta_k(\vec{l}_j)))) + p_{Ci}(p_{Di}(\vec{L_{MI}}(\vec{l}_j, \delta_k(\vec{l}_j))))) dt + $$

$$\int_{T_n + T_{MI}(\vec{L_{MI}}(\vec{l}_j, \delta_k(\vec{l}_j)))}^{T_{n+1}} \sum_i \left( p_{Di}(\delta_k(\vec{l}_j(t))) \right) + $$

$$p_{Si}(p_{Di}(\delta_k(\vec{l}_j(t)))) + p_{Ci}(p_{Di}(\delta_k(\vec{l}_j(t))))) dt$$

$$P = \int_{T_{n-1}}^{T_n} \sum_i p_i(\vec{l}_j(t)) dt + \qquad (16)$$

$$\int_{T_n}^{T_n + T_{MI}(\vec{L_{MI}}(\vec{l}_j, \delta_k(\vec{l}_j)))} \sum_i p_i(\vec{L_{MI}}(\vec{l}_j, \delta_k(\vec{l}_j))) dt +$$

$$\int_{T_n + T_{MI}(\vec{L_{MI}}(\vec{l}_j, \delta_k(\vec{l}_j)))}^{T_{n+1}} \sum_i p_i(\delta_k(\vec{l}_j(t))) dt$$

For a power feeding facility, a rated power is specified for each of a power supply, distribution board, and distributor according to a power feeding system. A condition of a permissible power whose upper limit is set to the rated power has to be observed. If the condition is not met, workloads of a group of devices connected to the power feeding system have to be reduced, or powers of the group of devices have to be limited. As for a cooling facility, rated processing capacities are specified for an air conditioner, a local cooling device, a liquid cooling device, a refrigerator, a cooling tower, or the like. It is necessary to suppress a device power so that the device power becomes equal to or lower than the capacity. For the cooling facility, a condition of a permissible power may be set for a region in a space, a zone, or a row of racks, in which a group of devices is installed, in order to raise cooling efficiency by keeping the devices within a range of operating temperatures and avoiding excessively concentration of heat dissipation.

Still another aspect of the present invention is such that power consumptions at positions of a group of devices, that is, a power distribution is obtained based on an optimal solution or approximate solution obtained by solving a workload allocation problem of allocating workloads to the group of devices, and arrangement information, and power feeding facilities or cooling facilities are controlled accordingly. Thus, facility running efficiency can be improved, and power-feeding losses or cooling powers can be suppressed. For example, as for the power feeding facility, the number of working devices among devices connected in parallel with one another is varied depending on an output power, whereby power feeding efficiency is improved. As for the cooling facility, an air or refrigerant supply temperature, an air volume or wind direction of an intake port, exhaust vent, or fan, and a temperature or flow rate of a refrigerator or cooling tower are adjusted according to a heat dissipation distribution, whereby cooling efficiency is improved.

Still another aspect of the present invention is exploitation of, as a means for allocating workloads to a group of devices, a virtual environment, job scheduler, SAN boot environment, or working management. The means is selected in consideration of the timing or cycle of allocation of workloads, an overhead or time loss derived from movement of workloads, fluctuation, production, or decrease of workloads, links among workloads of devices, pieces of working information on devices that can be acquired, ease of introduction into an existing or new system, security or reliability of a system, and others. The plural means may coexist on a parallel manner or stepwise. When the virtual environment is adopted, workloads are allocated to the group of devices by arranging virtual devices on a group of physical devices. When the job scheduler is adopted, workloads are allocated to the group of devices by arranging jobs on the group of devices. When the SAN boot environment is adopted, workloads are allocated to the group of devices by arranging the workloads on a group of devices to be activated. When the working management is adopted, workloads are allocated to the group of devices by arranging a group of devices to be worked, suspended, or stopped.

Still another aspect of the present invention is such that, and the group of devices is worked with change in allocation of workloads to a group of devices reflected thereon so that a total power required by the group of devices and facilities can be minimized. As for servers, software to which a workload is given, such as, an application, virtual machine, or job is moved from one to another. As for storages, data whose access frequency is high is moved or copied from one to another in order to move a workload to a destination. As for network devices, a network topology is modified in order to shift operational nodes.

According to the present invention, in, for example, an information processing system including a data center, a total power consumption required by a group of devices and facilities can be reduced through operational management through which the group of information processing devices and facilities are linked with one another.

BRIEF DESCRIPTION OF THE DRAWINGS

FIG. 11 is a diagram showing an example of resource data for the information processing systems in accordance with the embodiments;

FIG. 12 is a diagram showing an example of link data for the information processing systems in accordance with the embodiments; and FIG. 13 is a diagram showing an example of virtual machine resource reservation data for the information processing systems in accordance with the embodiments.

DETAILED DESCRIPTION OF THE PREFERRED EMBODIMENTS

The present invention provides a power-saving control method and device for an information processing system which optimize or minimize a total power, which is required by a group of devices and facilities and includes power consumptions necessary for rearrangement processing of workloads, by monitoring a variation or any other situation among workloads, and arranging the workloads to the group of devices in an appropriately intensive and decentralized manner according to the situation so as to meet contradictory requirements for the group of devices and facilities.

As previously described, according to the present invention, there are provided a power-saving control method and device for an information processing system which allocate workloads so as to minimize a total power, which is required by a group of devices and facilities, by acquiring arrangement information, which includes positions of the group of information processing devices, pieces of working information on the information processing devices, positions of facilities, and pieces of environment information on the facilities, obtaining power consumptions of the group of devices for workloads on the basis of the arrangement information, and obtaining power-feeding losses or cooling powers of facilities in relation to the power consumptions of the group of devices.

First Embodiment

Figure 1:
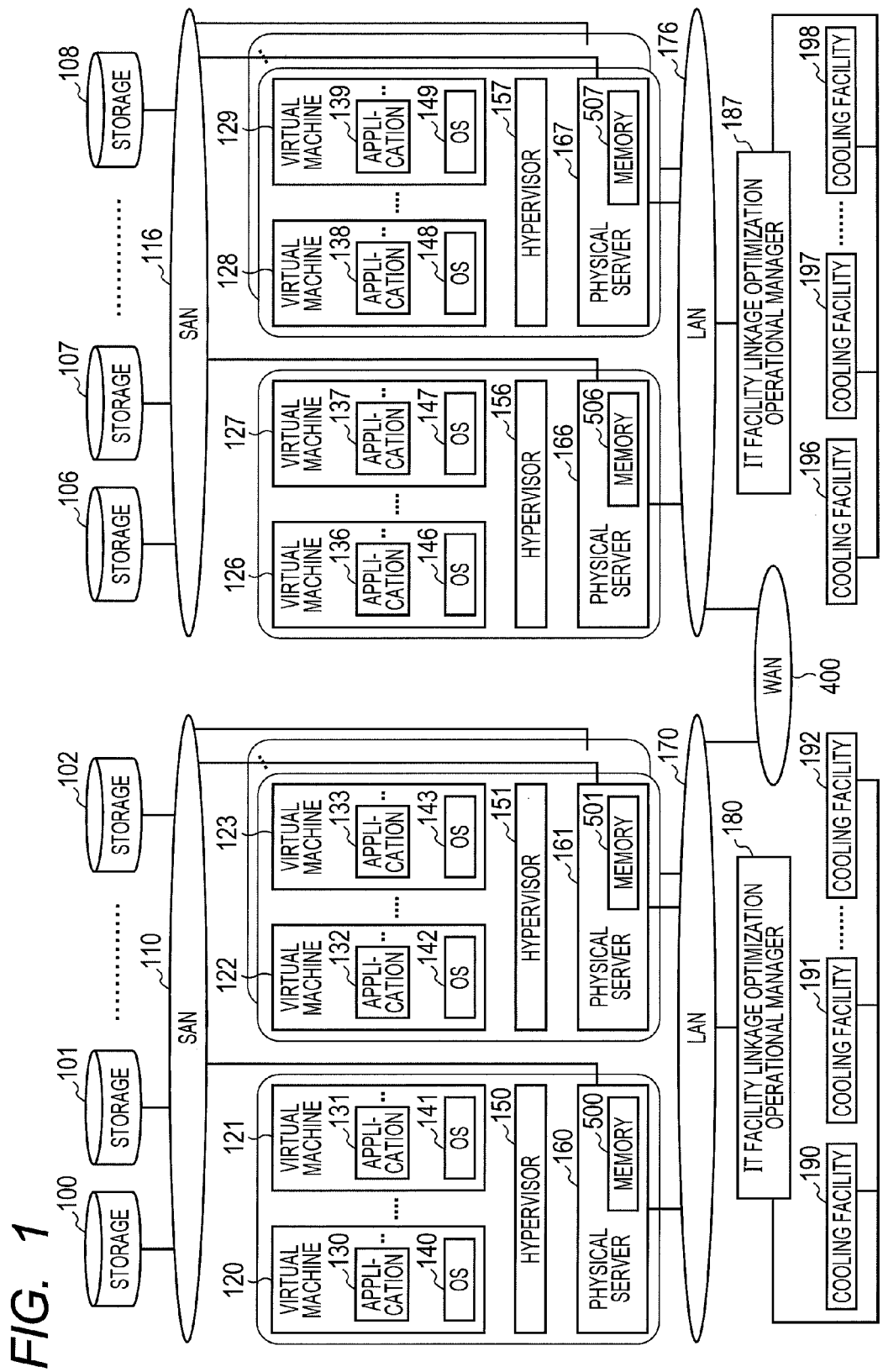
FIG. 1 is a diagram of an overall system configuration showing a power saving method for an information processing system, in which a virtual environment is constructed, in accordance with a first embodiment.

FIG. 1 is a diagram showing an overall configuration of an information processing system in accordance with the first embodiment, and is concerned with a power-saving control method for optimal arrangement of workloads in the information processing system having two hubs, that is, two data centers connected to each other over a network such as a wide-area network (WAN). The first embodiment is an embodiment concerned with the power-saving control method for the information processing system in which an executable environment for applications 130 to 139 in plural physical servers 160 to 167 is constructed.

The information processing system in accordance with the present embodiment has the configuration in which two hubs are connected to each other over a wide-area network (WAN) 400. Needless to say, the information processing system is not limited to the configuration having two hubs. For convenience' sake, part of the physical servers 160 to 167 and part of the applications 130 to 139 are excluded. For example, the physical server 162 or the like will be shown in FIG. 6 to be referred to later.

A data center that is one of the hubs includes physical servers 160 to 162, storages 100 to 102, a LAN 170 over which the physical servers 160 to 162 and storages 100 to 102 are interconnected so that they can communicate with one another, a SAN 110 over which the physical servers 160 to 162 and storages 100 to 102 are connected to one another so that the physical servers can access the storages, cooling facilities 190 to 192 that cool the physical servers 160 to 162, storages 100 to 102, LAN 170, and SAN 110, an information technology (IT) facility linkage optimization operational manager 180 that manages the physical servers 160 to 162, storages 100 to 120, LAN 170, SAN 110, and cooling facilities 190 to 192. In the data center, a virtual environment is constructed.

Likewise, a data center that is the other hub includes physical servers 166 and 167, storages 106 to 108, a LAN 176 over which the physical servers 166 and 167 are interconnected so that they can communicate with each other, a SAN 116 over which the physical servers 166 and 167 and storages 106 to 108 are connected to one another so that the physical servers can access the storages, cooling facilities 196 to 198 that cool the physical servers 166 and 167, storages 106 to 108, LAN 176, and SAN 116, and an IT facility linkages optimization operational manager 186 that manages the physical servers 166 and 167, storages 106 to 108, LAN 176, SAN 116, and cooling facilities 196 to 198. In the data center, a virtual environment is constructed. In the information processing system of the present embodiment, the two hubs have the same configuration. Hereinafter, the detailed configuration of one of the hubs, and actions in one of the hubs will be described below.

Figure 6:
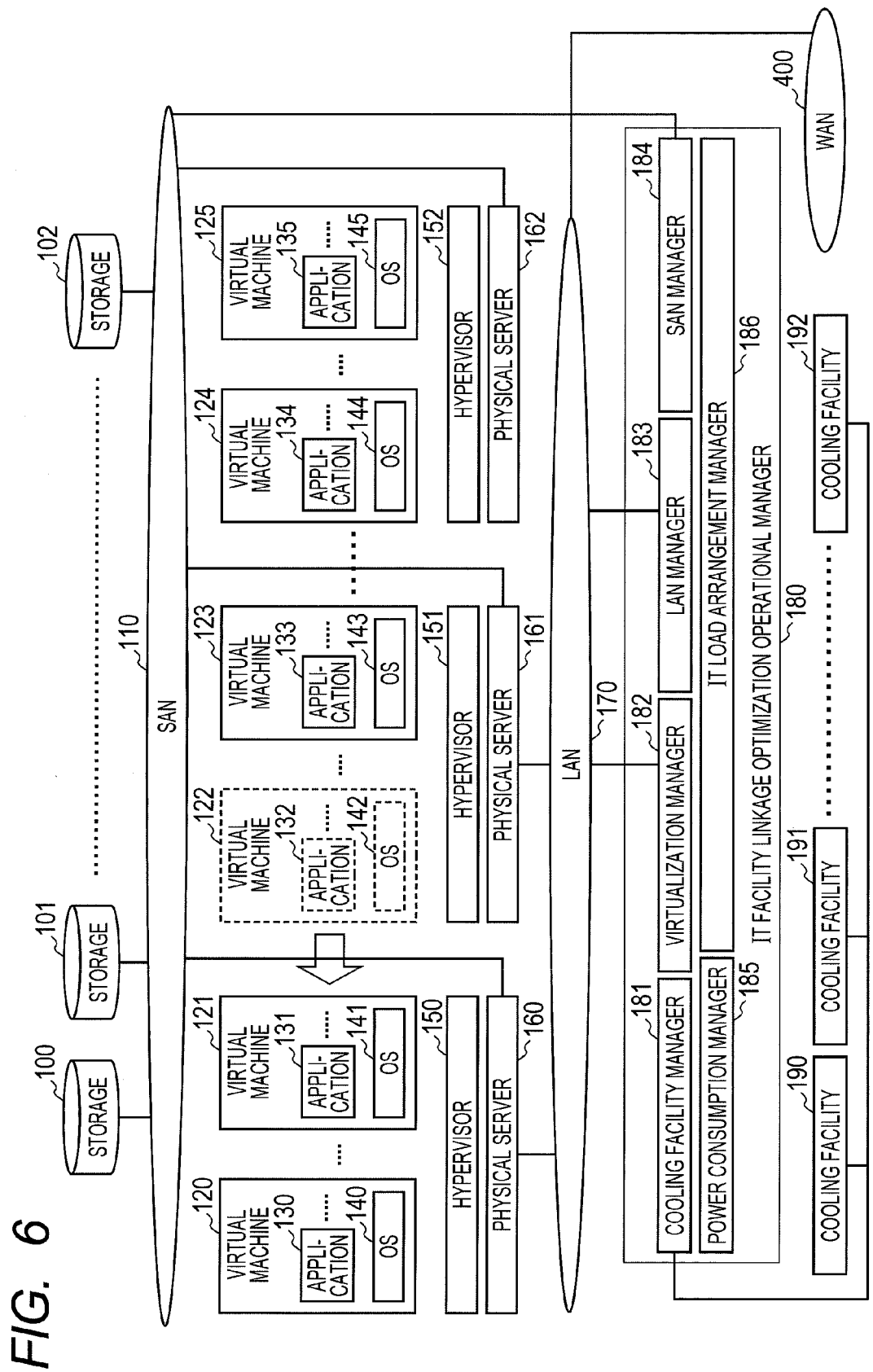
FIG. 6 is a diagram showing a system configuration of one hub in the information processing system, in which a virtual environment is constructed, in accordance with the first embodiment.

Referring to FIG. 1 and FIG. 6, virtual machines 120 to 125 are arranged on the physical servers 160 to 162 via hypervisors 150 to 152, and OSs 140 to 145 and applications 130 to 135 that are workloads make actions in the virtual machines.

In the IT facility linkage optimization operational manager 180, a LAN manager 183 that manages connections of the physical servers 160 and 161 onto the local area network (LAN) 170, an SAN manager 184 that manages connections over the storage area network (SAN) 110 among the physical servers 160 to 162 and the storages 100 to 102, a virtualization manager 182 that manages the physical servers 160 to 162 and the virtual machines 120 to 125, an IT load arrangement manager 186, and a cooling facility manager 181 make actions in cooperation with one another.

The IT load arrangement manager 186 cooperates with the virtualization manager 182, LAN manager 183, and SAN manager 184 so as to produce and implement rearrangement of the virtual machines 120 to 125 which minimizes the power consumption of the information processing system without degradation of the processing performances of the applications 130 to 139 on the basis of pieces of future working information derived from working reservations for the virtual machines 120 to 125 (for example, central processing unit (CPU) working ratios, memory usages, storage access bandwidths, and network access bandwidths), or pieces of future working information derived from working estimations performed based on pieces of past working information on the virtual machines 120 to 125 (for example, CPU working ratios, memory usages, storage access bandwidths, and network access bandwidths). The cooling facility manager 181 receives the current power consumption information and near future (for example, ten-minutes after) power consumption information on the information processing system from a power consumption manager 185, and controls the cooling facilities 190 to 192 on the basis of the pieces of information.

The power consumption of the information processing system of the present embodiment having the foregoing configuration is generally determined with arrangement of the virtual machines 120 to 120 on the physical servers 160 to 162, and working situations of the virtual machines 120 to 125. For example, as indicated with an arrow mark in FIG. 6, the virtualization manager 182 rearranges the virtual machines 122 and 123, which are arranged on the physical server 161, in the physical server 160 or physical server 162. If the virtual machine that is arranged on the physical server 161 and is in action does not exist, the power supply of the physical server 161 can be turned off.

In contrast, when the virtual machines 122 and 123 are arranged on the physical server 160, a load imposed on the physical server 160 increases, and a power consumption increases accordingly. However, in general, when the increase in the power consumption of the physical server 160 is compared with a decrease in the power consumption attributable to the fact that the power supply of the physical server 161 is turned off, the decrease is larger. As a result, the power consumption of the information processing system can be minimized.

In addition, in such a situation that the application 130 which makes an action on the operating system (OS) 140 in the virtual machine 120 arranged on the physical server 160 communicates with the application 132, which make actions on the OS 142 in the virtual machine 122 arranged on the physical server 161, over the LAN 170, network devices constituting the LAN 170 consumes power. When the position of the virtual machine 122 is changed from the physical server 161 to the physical server 160, the application 130 and application 132 can communicate with each other without intervention of the LAN 170. Accordingly, the power consumptions of the network devices constituting the LAN 170 can be minimized.

In contrast, in one of working situations of the virtual machines 120 and 121 and the virtual machines 122 and 123, that is, when a sum total of CPU working ratios exceeds the throughput of the physical server 160, if the virtual machines 122 and 123 are rearranged from the physical server 161 onto the physical server 160, the performances of the OSs 140 to 143 and the applications 130 to 133 which make actions in the virtual machines 120 to 123 are degraded.

In one of the working situations of the virtual machines 120 and 121 and virtual machines 122 and 123, that is, when a sum total of memory usages exceeds an installed memory capacity of the physical server 160, the hypervisor 150 performs swapping processing which involves the virtual memory. This degrades the processing performances of the OSs 140 to 143 and the applications 130 to 133 which make actions in the virtual machines 120 to 123.

In one of the working situations of the virtual machines 120 and 121 and the virtual machines 122 and 123, that is, when a sum total of bandwidths permitted to access the storages 100 to 102 over the SAN 110 exceeds a permissible bandwidth at which the physical server 160 is permitted to access the storage over the SAN 110, if the virtual machines 122 and 123 are rearranged from the physical server 161 onto the physical server 160, the storage access performances of the OSs 140 to 143 and the applications 130 to 133 which make actions in the virtual machines 120 to 123 are degraded. As a result, the processing performances are degraded.

Assume that the applications 130 and 131 which make actions in the virtual machines 120 and 121 arranged on the physical server 160, and the applications 132 and 133 which make actions in the virtual machines 122 and 123 arranged on the physical server 161 communicate with the applications 134 and 135, which make actions in the virtual machines 124 and 124 arranged on the physical server 162, over the LAN 170. In this case, when a sum total of bandwidths employed in the communication exceeds a permissible bandwidth for communication between the physical server 160 and physical server 162 over the LAN 170, if the virtual machines 122 and 123 are rearranged from the physical server 161 onto the physical server 160, the communication performances of the applications 130 and 133 that make actions in the virtual machines 120 to 123, and of the applications 134 and 135 that make actions in the virtual machines 124 and 125 are degraded. As a result, the processing performance of the information processing system is degraded.

In contract, when the virtualization manager 182 controls the hypervisors 150 to 152 and rearranges the virtual machines 120 to 125 on the physical servers 160 to 162, processing is performed over the LAN 170.

Therefore, when the virtual machine 122 is, as indicated with an arrow mark in FIG. 6, rearranged from the physical server 161 onto the physical server 160, the devices forming at least the physical server 160, physical server 161, and LAN 170 are involved in the processing. When the processing relevant to the rearrangement is performed, the power consumptions of the devices forming the physical server 160, physical server 161, and LAN 170 are increased, and a bandwidth permitted for communication between the physical server 160 and physical server 161 over the LAN 170 is wasted.

Normally, in the information processing system in which an application executable environment is constructed using a virtualization environment, in order to prevent communication over the LAN 170 among the applications 130 to 135, which make actions in the virtual machines 120 to 125 arranged on the physical servers 160 to 162, from being adversely affected, a dedicated segment of the LAN 170 other than a segment of the LAN 170 to be used by communications among the applications 130 to 135 is available in communication over the LAN 170 to be established when the virtual machines 120 to 125 are rearranged on the physical servers 160 to 162. If the segment is unavailable, the IT load arrangement manager 186 has to take into account wasting of the bandwidth permitted for communication over the LAN 170 between the physical server 160 and physical server 161.

The IT load arrangement manager 186 in the information processing system of the present embodiment determines the timing of rearranging the virtual machines 120 to 125 on the physical servers 160 to 162 on the basis of pieces of future working information derived from working reservations for the virtual machines 120 to 125 (for example, CPU use ratios, memory usages, storage access bandwidths, and network access bandwidths), or pieces of future working information derived from working estimations performed based on pieces of past working information on the virtual machines 120 to 125 (for example, CPU use ratios, memory usages, storage access bandwidths, and network access bandwidths). The IT load arrangement manager 186 then produces a rearrangement plan for the virtual machines 120 to 125 which realizes minimization of the power consumption of the information processing system without degradation of the performances of the OSs 140 to 145 and the applications 130 to 135 which make actions in the virtual machines 120 to 125.

Based on arrangement information on the current virtual machines 120 to 125, arrangement information on the rearranged virtual machines 120 to 125, and pieces of future working information, a power to be consumed by the information processing system during rearrangement processing performed on the virtual machines 120 to 125, and the power consumption of the information processing system to be required during a period from one rearrangement timing to the next rearrangement timing after the virtual machines 120 to 125 are rearranged are calculated.

In addition, based on the current arrangement information on the virtual machines 120 to 125 and pieces of future working information, the power consumption of the information processing system to be required when the virtual machines 120 to 125 are not rearranged is calculated.

Herein, assume that the power consumption of the information processing system required after the virtual machines 120 to 125 are rearranged falls below the power consumption of the information processing system required when the virtual machines 120 to 125 are not rearranged. In this case, the IT load arrangement manager 186 schedules implementation of the produced rearrangement plan for the virtual machines 120 to 125 at the rearrangement timing via the virtualization manager 182.

The power consumption manager 185 regularly transmits the current power consumption of the information processing system to the cooling facility manager 181. At the same time, the power consumption manager 185 calculates the near future (for example, ten-minutes after) power consumption of the information processing system on the basis of the rearrangement plan scheduled by the IT load arrangement manager 186, its implementation schedule, and pieces of future working information (for example, CPU working ratios, memory usages, storage access bandwidths, and network access bandwidths) derived from working reservations made for the virtual machines 120 to 125, or pieces of future working information derived from working estimations performed based on pieces of past working information (for example, CPU working ratios, memory usages, storage access bandwidths, and network access bandwidths) on the virtual machines 120 to 125. The power consumption manager 185 regularly transmits the calculated power consumption to the cooling facility manager 181.

Since feedback control that employs temperature sensors of the cooling facilities 190 to 192 brings about a time delay, the cooling facility manager 181 conventionally controls the running of the cooling facilities 190 to 192 by setting the blast temperatures, blast volumes, or the like with margins added thereto on the assumption that all devices constituting the information processing system make actions with rated power consumptions.

In contrast, in the information processing system of the present embodiment, as described later, since a current power consumption of the information processing system is regularly received, a time lag caused by feedback control can be resolved. As a result, in control of the running of the cooling facilities 190 to 192, margins to be added to the blast temperatures, blast volumes, or the like can be set to small values. Eventually, the power consumptions of the cooling facilities 190 to 192 can be minimized.

Even when the cooling facility manager 181 sets the blast temperatures, blast volumes, or the like so as to control the running of the cooling facilities 190 to 192, a time lag cannot help elapsing until the resultant effect prevails all over a floor. In the control of the running of the cooling facilities 190 to 192, the blast temperatures, blast volumes, or the like are conventionally set with margins added thereto.

In contrast, the cooling facility manager 181 in the present embodiment receives, as detailed later, near future (for example, ten-minutes after) power consumption information on the information processing system so as to precedently control the cooling facilities 190 to 192. Since the time lag can be resolved, margins to be added to the blast temperatures, blast volumes, or the like can be set to smaller values in order to control the running of the cooling facilities 190 to 192. Eventually, the power consumptions of the cooling facilities 190 to 192 can be minimized.

As mentioned above, owing to the information processing system of the present embodiment, an information processing system in which an executable environment for the applications 130 to 135 is constructed on the plural physical servers 160 to 162 can be realized, and the power consumptions of the cooling facilities can be minimized.

Referring to FIG. 2 to FIG. 5, actions to be performed according to a power-saving control method that takes account of a cost concerning migration between two hubs in the information processing system of the present embodiment shown in FIG. 1 will be described below. Hereinafter, a description will be made by taking for instance physical servers 1 and 2 and virtual machines 230 to 233. The physical servers and virtual machines refer to any of the physical servers 160 to 162, 166, and 167 and the virtual machines 120 to 129 shown in FIG. 1 and FIG. 6.

Figure 2:
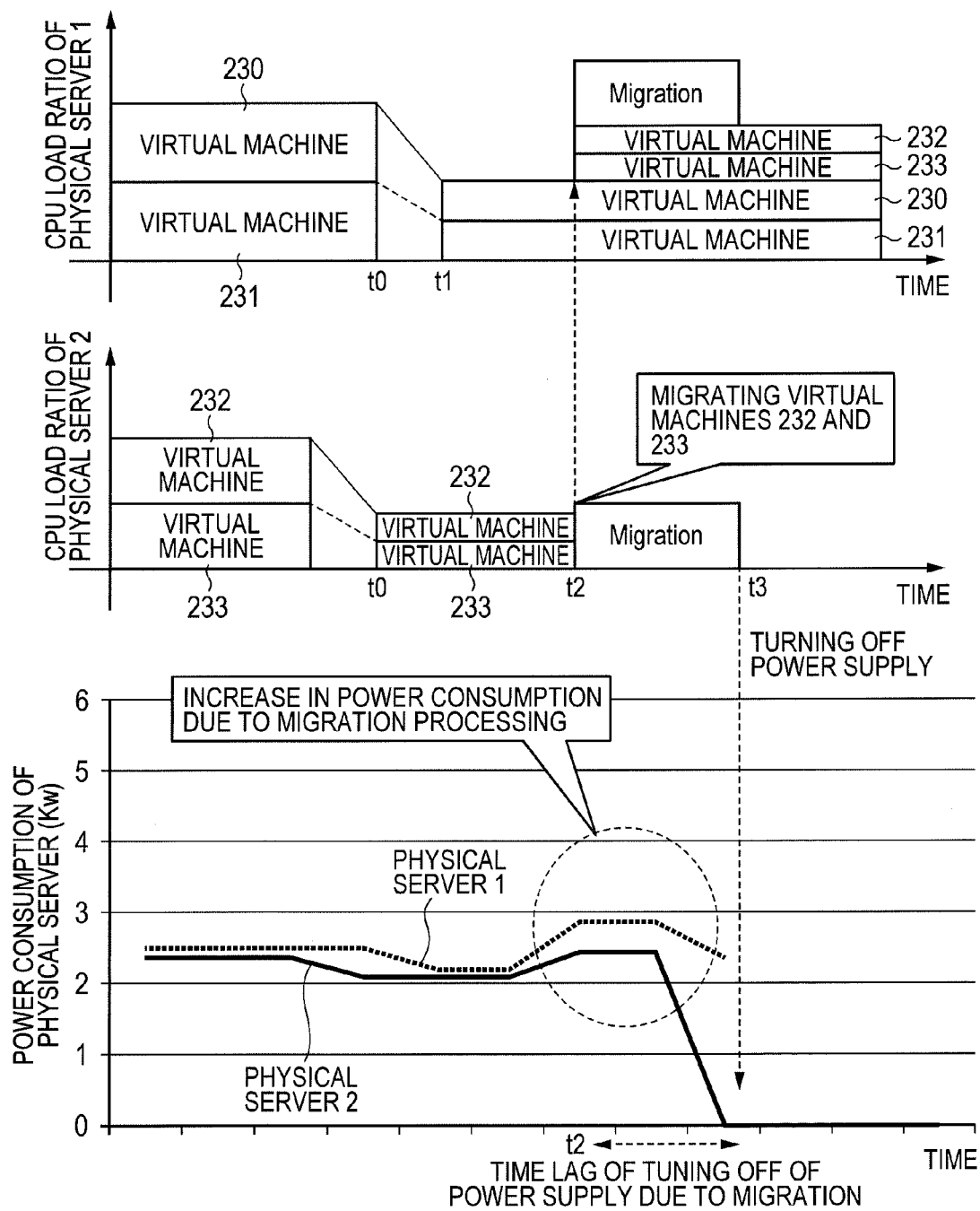
FIG. 2 is a schematic diagram showing optimal arrangement, which has a migration cost taken into account, in accordance with the first embodiment.

As shown in FIG. 2, at a time t0, the loads on the virtual machines 232 and 233 on the physical server 2 are lowered. At a time t1, the loads on the virtual machines 230 and 231 on the physical server 1 are lowered.

The IT load arrangement manager 186 shown in FIG. 6 decides to move the virtual machines 232 and 233 from the physical server 2 to the physical server 1, and turn off the power supply of the physical server 161 so as to achieve power saving.

In response to the decision, the information processing system shown in FIG. 1 initiates migration at a time t2. The virtual machines 232 and 233 are executed on the physical server 1, and processing of migration is performed over the physical servers 1 and 2.

At a time t3, the migration processing is completed. Processing to be performed on the physical server 2 runs out, and the power supply of the physical server 2 can therefore be turned off.

The power consumption of the physical server 2 is obtained as P=A×load ratio (%)+B.

Since the migration processing is performed on the physical servers 1 and 2, the power consumptions are, as shown in FIG. 2, increased during the migration processing.

While the migration processing is in progress, although a virtual machine that should be executed is absent from the physical server 2, the power supply of the physical server 2 cannot be turned off. After the migration processing is completed at a time t3, the power supply can be turned off.

In the information processing system shown in FIG. 1, when a group of physical servers like the physical servers 1 and 2 exists at one hub, that is, on the same LAN 170 and shares the storages 100 to 102 on the same SAN 10 between them, the time of migration processing is short. Therefore, even when the migration processing is ignored, there is no adverse effect.

However, when the group of physical servers exists, as shown in FIG. 1, at two hubs, that is, at different data centers or on different LANs 170 and 176, or employs the storages 100 to 102 on the SAN 110 or the storages 106 to 108 on the SAN 116, it takes much time to perform migration processing. An increase in power consumptions due to the migration processing and a lag in turning off the power supply of the physical server have to be taken into consideration.

In this case, since the power consumptions increase due to the migration processing, the running of air conditioners has to be controlled accordingly. In addition, since a virtual machine is moved to a different LAN or comes to employ storages on a different SAN, unless arrangement of the virtual machine is determined in consideration of input and output performances, performance of an application is adversely affected.

The IT load arrangement managers 186 included in the respective IT facility linkage optimization operational managers 180 and 187 of the information processing system in accordance with the present embodiment implement operation as described below.

Figure 3:
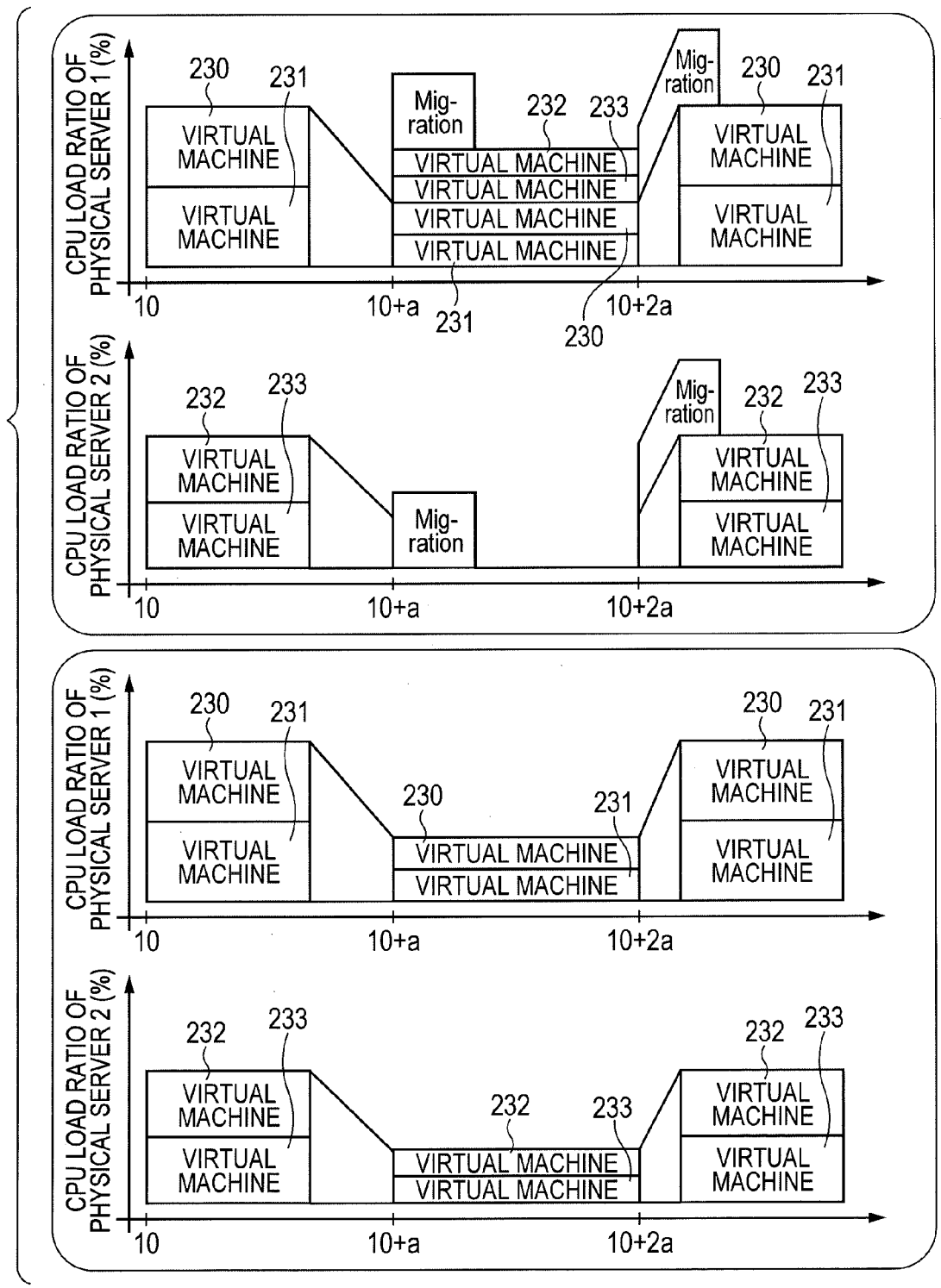
FIG. 3 is a schematic diagram showing optimal arrangement, which has the migration cost taken into account, in accordance with the first embodiment.

As shown in FIG. 3, at intervals of a certain time (time a) since a time t0, the IT load arrangement manager 186 deduces an arrangement pattern for virtual machines (physical servers and storages to be allocated to virtual machines), which minimizes the power consumption of the entire system, on the basis of load estimations calculated based on working histories of the respective virtual machines.

For each arrangement pattern, a cost of migration processing (time or an increase in power consumption) from current allocation of a virtual machine is calculated in consideration of the topologies of a LAN and SAN and a communication bandwidth between nodes.

A power saved during a period during which the power supply of the physical server is turned off and which is determined in consideration of the time of migration processing calculated in relation to each arrangement pattern is calculated.

Thereafter, based on an increase in power consumption due to migration processing calculated in relation to each arrangement pattern, and a power saved while the power supply of the physical server is turned off, a power-saving effect on the entire system is calculated and an arrangement pattern leading to the largest power-saving effect is selected.

Assume that a cost (time or an increase in power consumption) of migration processing associated with any of arrangement patterns is large and that a power-saving effect is not exerted. In this case, arrangement optimization to be attained by moving virtual machines through migration is not carried out. As shown in the lower part of FIG. 3, arrangement of virtual machines attained at that time is held intact.

Figure 4:
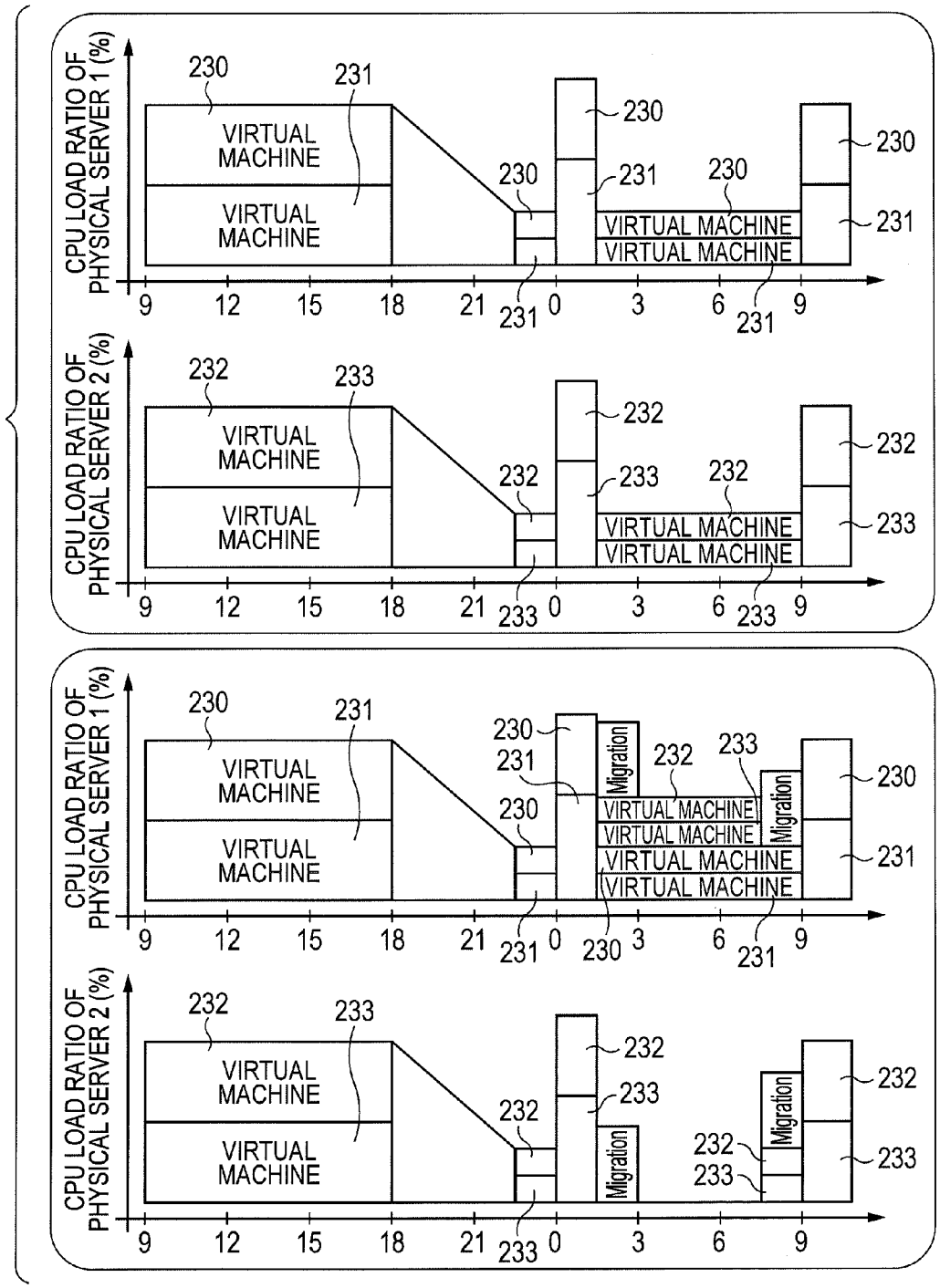
FIG. 4 is a schematic diagram showing optimal arrangement, which has the migration cost taken into account, in accordance with the first embodiment.

FIG. 4 is a diagram showing another example of actions to be performed in the information processing system of the present embodiment. As shown in the upper part of FIG. 4, virtual machines that undergo a daily load variation generally seen in the world are handled. Specifically, a load is high in the daytime (from 9:00 a.m. to 6:00 p.m.), decreases gradually until 11:00 p.m., and increases due to daily processing or the like from one hour from midnight. Thereafter, a low-load state is attained until nine in the morning.

As mentioned above, in the information processing system for which a steady load variation such as a daily variation can be preconditioned, planned system operation is introduced. As for the low-load state from 2:00 a.m. to 9:00 a.m., as shown in the lower part of FIG. 4, it is apparent on a design stage that power saving can be achieved despite a cost of migration processing of migrating the virtual machines 232 and 233 from the physical server 2 to the physical server 1. In this case, power saving that utilizes turning off of the power supply of the physical server from which the virtual machines are moved is introduced as planned operation.

As for the low-load state from 11:00 p.m. to midnight, it is apparent that an effect of power saving attributable to the fact that the power supply of the physical server from which the virtual machines are moved is turned off is not exerted because of shortness of the period of time and a cost of migration processing. In this case, as shown in the lower part of FIG. 4, the power saving due to the turning off of the power supply of the physical server from which the virtual machines are moved is not introduced as planned operation.

As for the low-load state from 1:00 a.m. to 9:00 a.m., it is apparent on a design state that an effect of power saving due to turning off of the power supply of the physical server from which the virtual machines are moved is exerted owing to the long period of time despite a cost of migration processing. In this case, as shown in the lower part of FIG. 4, the power saving due to the turning off of the power supply of the physical server from which the virtual machines are moved is introduced as planned operation. However, in order to cope with an abrupt increase in a load occurring at 9:00 a.m. or an opening time, the virtual machines 232 and 233 having been moved to the physical server 1 are moved to the physical server 2 at about 7:00 a.m. so that migration of the virtual machines 232 and 233 can be completed by 9:00 a.m. by which the physical server 2 has room for a load.

Next, referring to FIG. 5, a preferred example of actions to be performed when power saving is achieved by reducing margins employed in running control of air conditioners will be described below.

Figure 5:
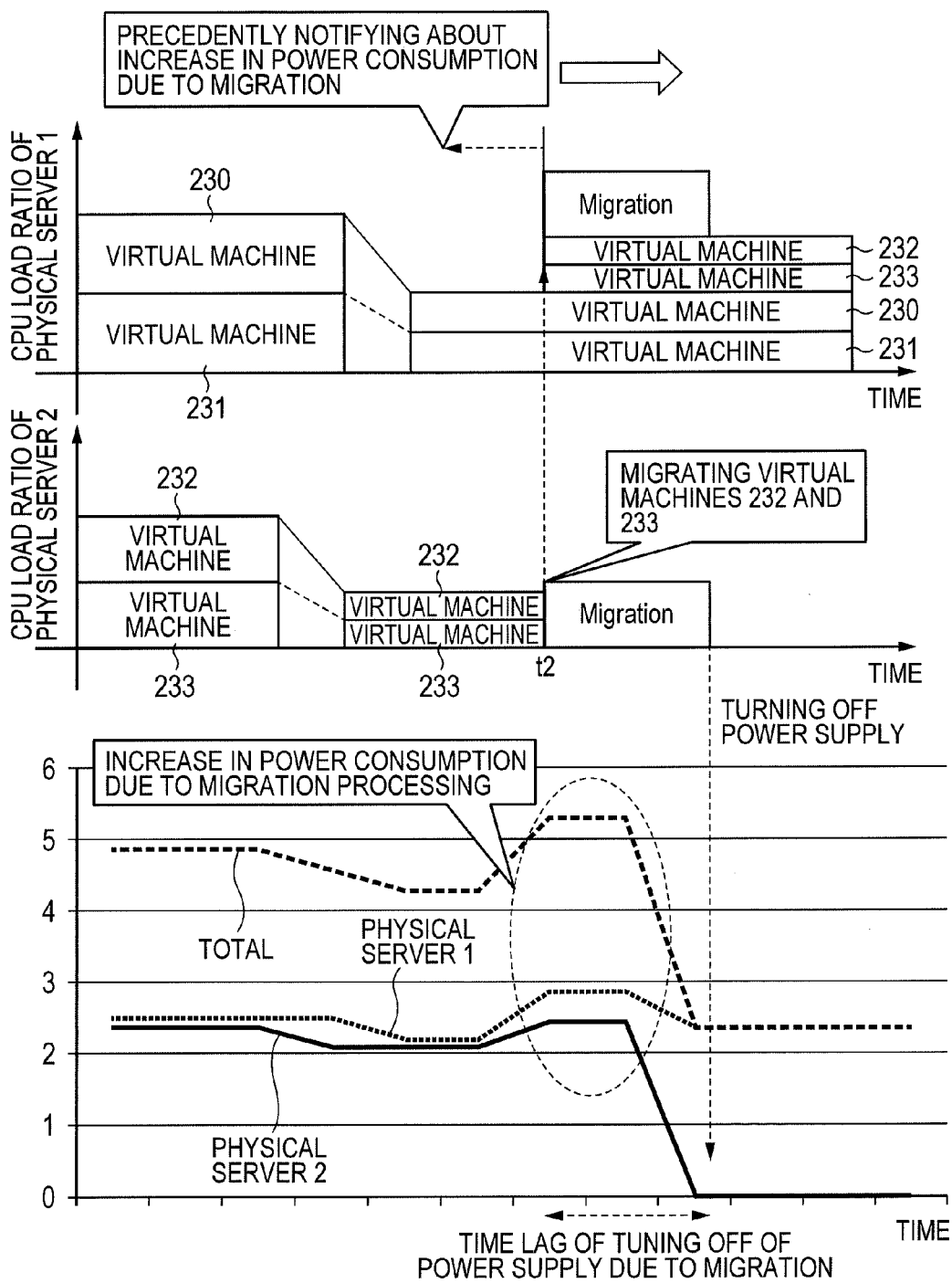
FIG. 5 is a diagram for use in schematically explaining a system in accordance with the first embodiment in which information is transmitted from an IT side to an air conditioner in order to precedently control the air conditioner.

In a power saving control method shown in FIG. 5, since it takes much time until an effect of switching of running modes prevails in an entire room, running of air conditioners is controlled with margins set in consideration of the time through optimization control of the running of the air conditioners.

As shown in the upper part of FIG. 5, when a cost of migration processing (time or an increase in power consumption) is markedly large, control of selecting a mode in which air-conditioner running control is intensified is introduced prior to the initiation of the migration processing in order to reduce the margins employed in control of the running of the air conditioners. Thus, power saving of the air conditioners is achieved.

Like the aforesaid example of actions, the IT load arrangement manager 186 deduces an arrangement pattern of virtual machines, which minimizes the power consumption of the entire system, on the basis of load estimations calculated based on working histories of the virtual machines at intervals of a certain period (of time a). In this case, prior to initiation of cyclic rearrangement processing (migration) of virtual machines, the cooling facility manager is notified of increases in loads. Accordingly, optimization control of running of the air conditioners is implemented.

As for the aforesaid planned operation, a cost of migration processing is estimated in advance, and the cooling facility manager implements optimization control of running of the air conditioners on the basis of the estimate.

Second Embodiment

Figure 7:
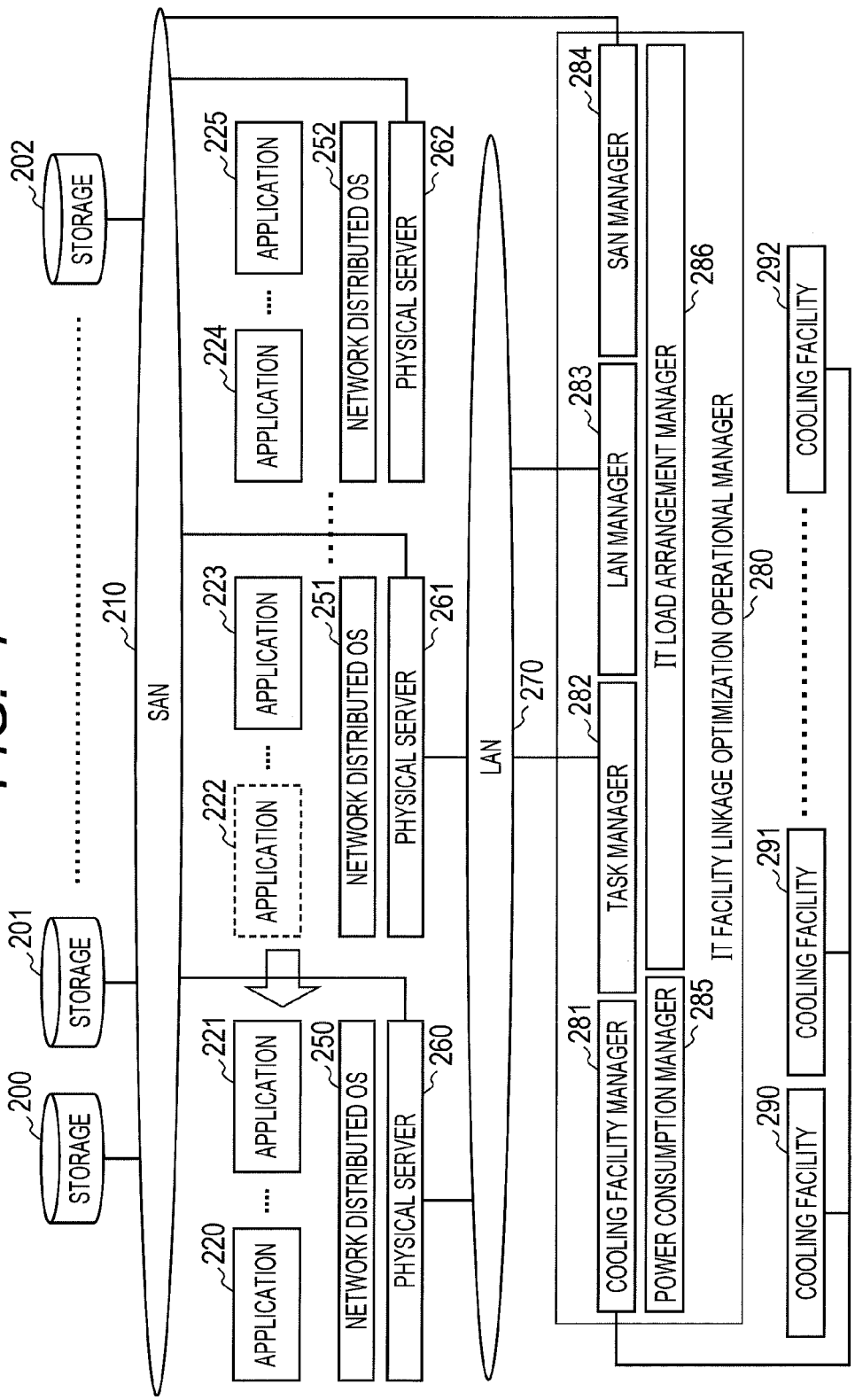
FIG. 7 is a diagram showing a system configuration of one hub in an information processing system, which is constructed based on distributed OSs, in accordance with a second embodiment.

FIG. 7 is a configuration diagram showing a power-saving control method for an information processing system in accordance with a second embodiment in which an executable environment for applications 220 to 225 is constructed on plural physical servers 260 to 262 by adopting network distributed OSs.

The information processing system includes physical servers 260 to 262, storages 200 to 202, a LAN 270 over which the physical servers 260 to 262 are interconnected to communicate with one another, an SAN 210 over which the physical servers 260 to 262 and storages 200 to 202 are connected to one another so that the physical servers can access the storages, cooling facilities 290 to 292 that cool the physical servers 260 to 262, storages 200 to 202, LAN 270, and SAN 210, and an IT facility linkage optimization operational manager 280 that manages the physical servers 260 to 262, storages 200 to 202, LAN 270, SAN 210, and cooling facilities 290 to 292. In the information processing system, a virtual environment is constructed.

On the physical servers 260 to 262, an application executable environment is constructed using the network distributed OSs 250 to 252, and the applications 220 to 225 that are workloads make actions in the OSs.

In the IT facility linkage optimization operational manager 280, a LAN manager 283 that manages interconnection of the physical servers 260 to 262 over the LAN 270, an SAN manager 284 that manages connections over the SAN 210 among the physical servers 260 to 262 and storages 200 to 202, a task manager 282 that manages the physical servers 260 to 262 and applications 220 to 225, an IT load arrangement manager 286 that cooperates with the task manager 282, LAN manager 283, and SAN manager, and produces and implements rearrangement of applications 220 to 225 which minimizes the power consumption of the information processing system without degradation of the performances of the applications 220 to 225 on the basis of pieces of future working information derived from working reservations for the applications 220 to 225 (for example, CPU use ratios, memory usages, storage access bandwidths, and network access bandwidths) or on the basis of pieces of future working information derived from working estimations based on pieces of past working information on the applications 220 to 225 (for example, CPU use ratios, memory usages, storage access bandwidths, and network access bandwidths), and a cooling facility manager 281 that receives current power consumption information on the information processing system and near future (for example, ten-minutes after) power consumption information on the information processing system from the IT load arrangement manager 286, and optimally controls the cooling facilities 290 to 292 on the basis of the pieces of power consumption information make actions in cooperation with one another.

The power consumption of the information processing system of the present embodiment is determined generally with the arrangement of the applications 220 to 225 on the physical servers 260 to 262 and the working situations of the applications 220 to 225.

For example, the task manager 282 rearranges the applications 222 and 223, which have been arranged on the physical server 261, onto the physical server 260 or physical server 262. If no applications are arranged on the physical server 261 and are in action, the power supply of the physical server 261 is turned off.

In contrast, when the applications 222 and 223 are arranged on the physical server 260, the load on the physical server 260 is increased. Accordingly, the power consumption increases. However, in general, when an increase in the power consumption of the physical server 260 is compared with a decrease in the power consumption attributable to the fact that the power supply of the physical server 261 is turned off, the decrease is larger. As a result, minimization of the power consumption of the information processing system can be achieved.

In addition, when the application 220 arranged on the physical server 260 and the application 222 arranged on the physical server 261 communicate with each other over the LAN 270, network devices constituting the LAN 270 consumes power. However, when the application 222 is rearranged from the physical server 261 onto the physical server 260, the applications 220 and 222 can communicate with each other without intervention of the LAN 270. Accordingly, the power consumption required by the network devices constituting the LAN 270 can be minimized.

In contrast, in one working situation for the applications 220 and 221 and applications 222 and 223, that is, when a sum total of CPU working ratios exceeds the throughput of the physical server 260, if the applications 222 and 223 are rearranged from the physical server 261 onto the physical server 260, the performances of the applications 220 to 223 are degraded.

In one working situation of the applications 220 and 221 and applications 222 and 223, that is, when a sum total of memory usages exceeds an installed memory capacity of the physical server 260, the network distributed OS 250 performs swapping processing on a virtual memory, the performances of the applications 220 to 223 are degraded.

In one working situation of the applications 220 and 221 and the applications 222 and 223, that is, when a sum total of bandwidths permitted to access the storages over the SAN 210 exceeds a permissible bandwidth at which the physical server 260 is permitted to access the storages over the SAN 210, if the applications 222 and 223 are rearranged from the physical server 261 onto the physical server 260, the performances of the applications 220 to 223 for accessing the storages is degraded. As a result, the processing performances are degraded.

Assume that the applications 220 and 221 arranged on the physical server 260 and the applications 222 and 223 arranged on the physical server 261 communicate with one another via the applications 224 and 225, which are arranged on the physical server 262, over the LAN 270, and that a sum total of bandwidths permitted for the communications exceeds a permissible bandwidth permitted for communication between the physical servers 260 and 262 over the LAN 270. In this case, if the applications 222 and 223 are rearranged from the physical server 261 onto the physical server 260, the communication performances of the applications 220 to 223 and the applications 224 and 225 are degraded. As a result, the processing performances are degraded.

In contrast, when the task manager 282 controls the network distributed OSs 250 to 252 so as to rearrange the applications 220 to 225 on the physical servers 260 to 262, processing is performed over the LAN 270.

Therefore, when the application 222 is rearranged from the physical server 261 onto the physical server 260, at least the physical servers 260 and 261, and the devices constituting the LAN 270 are involved in the processing. When the processing concerning the rearrangement is performed, the power consumptions of the physical servers 260 and 261, and of the devices constituting the LAN 270 are increased. In addition, the bandwidth permitted for communication between the physical servers 260 and 261 over the LAN 270 is wasted.

Assuming that the LAN 270 is not structured for fear wasting of a bandwidth permitted for communication between the physical servers 260 and 261 over the LAN 170 may adversely affect communications among the applications 220 to 225 over the LAN 270, the IT load arrangement manager 286 has to take account of the wasting of the communication bandwidth.

The IT load arrangement manager 286 determines the timing of rearranging the applications 220 to 225 on the physical servers 260 to 262 on the basis of pieces of future working information derived from working reservations for the applications 220 to 225 (for example, CPU use ratios, memory usages, storage access bandwidths, and network access bandwidths) or pieces of future working information derived from working estimations based on pieces of past working information (for example, CPU use ratios, memory usages, storage access bandwidths, and network access bandwidths) on the applications 220 to 225. The IT load arrangement manager 286 then produces a rearrangement plan for the applications 220 to 225 which realizes minimization of the power consumption of the information processing system without degradation of the performances of the applications 220 to 225.

Based on arrangement information on the current applications 220 to 225, arrangement information on the rearranged applications 220 to 225, and pieces of future working information, the IT load arrangement manager 286 then calculates a power to be consumed by the information processing system during rearrangement processing performed on the applications 220 to 225, and the power consumption of the information processing system to be required during a period from the rearrangement timing to the next rearrangement timing after the applications 220 to 225 are rearranged.

In addition, based on arrangement information on the current applications 220 to 225 and pieces of future working information, the power consumption of the'information processing system required when the applications 220 to 225 are not rearranged is calculated.

Assume that the power consumption of the information processing system required after the applications 220 to 225 are rearranged falls below the power consumption of the information processing system required when the applications 220 to 225 are not rearranged, the IT load arrangement manager 286 schedules implementation of the produced rearrangement plan for the applications 220 to 225 at the rearrangement timing via the task manager 282. The power consumption manager 285 regularly transmits the current power consumption of the information processing system to the cooling facility manager 281. At the same time, the power consumption manager 295 calculates the near future (for example, ten-minutes after) power consumption of the information processing system on the basis of the rearrangement plan scheduled by the IT load arrangement manager 286, its implementation schedule, and pieces of future working information (for example, CPU use ratios, memory usages, storage access bandwidths, and network access bandwidths) derived from working reservations made for the applications 220 to 225, or pieces of future working information derived from working estimations based on pieces of past working information (for example, CPU use ratios, memory usages, storage access bandwidths, and network access bandwidths) on the applications 220 to 225, and regularly transmits the power consumption to the cooling facility manager 281.

Since feedback control that employs temperature sensors or the like of the cooling facilities 290 to 292 brings about a time lag, the cooling facility manager 281 conventionally controls the running of the cooling facilities 290 to 292 by setting blast temperatures, blast volumes, or the like with margins added thereto on the assumption that all devices constituting the information processing system make actions with rated power consumptions.

In contrast, the time lag occurring in the feedback control can be resolved by regularly receiving the current power consumption of the information processing system. As a result, when the running of the cooling facilities 290 to 292 is controlled, margins to be added to the blast temperatures, blast volumes, or the like can be set to small values. Eventually, the power consumptions of the cooling facilities 290 to 292 can be minimized.

Although the cooling facility manager 281 sets the blast temperatures of the cooling facilities 290 to 292, a time lag cannot help elapsing until the resultant effect prevails throughout the floor. Therefore, when the running of the cooling facilities 290 to 292 is controlled, the blast temperatures, blast volumes, or the like are set with margins added thereto.

In contrast, when the cooling facility manager 281 receives near future (for example, ten-minutes after) power consumption information on the information processing system, the cooling manager 281 can precedently control the cooling facilities 290 to 292 so as to thus resolve the time lag. Therefore, when the running of the cooling facilities 290 to 292 is controlled, the margins to be added to the blast temperatures, blast volumes, or the like can be set to smaller values. Eventually, the power consumptions of the cooling facilities 290 to 292 can be minimized.

As mentioned above, according to the present embodiment, owing to the network distributed OSs, the power consumption of the information processing system in which an executable environment for the applications 220 to 225 is constructed on the plural physical servers 260 to 262, and the power consumptions of the cooling facilities can be minimized.

Figure 8:
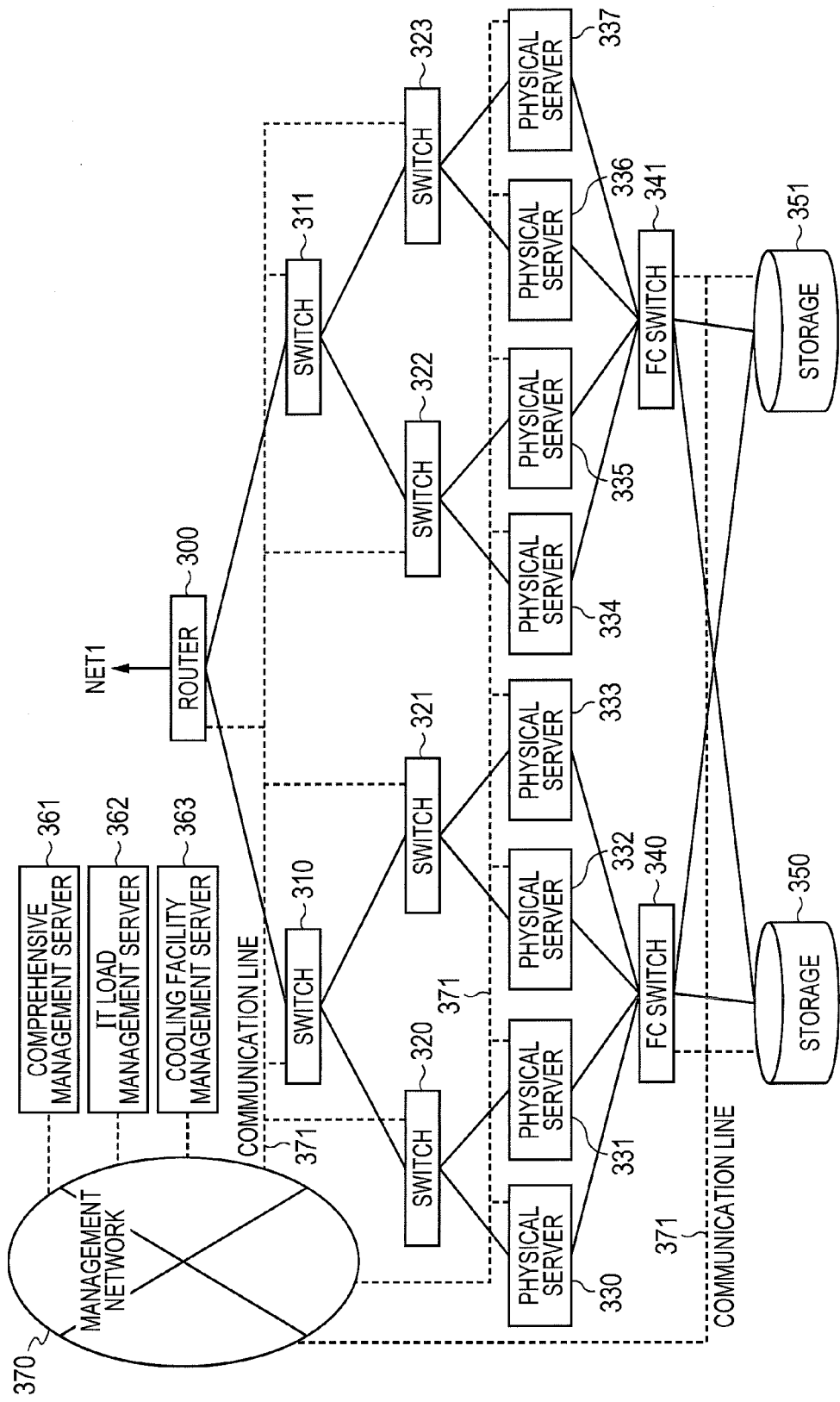
FIG. 8 is a diagram showing an example of a network structure for the information processing systems in accordance with the embodiments.
Figure 9:
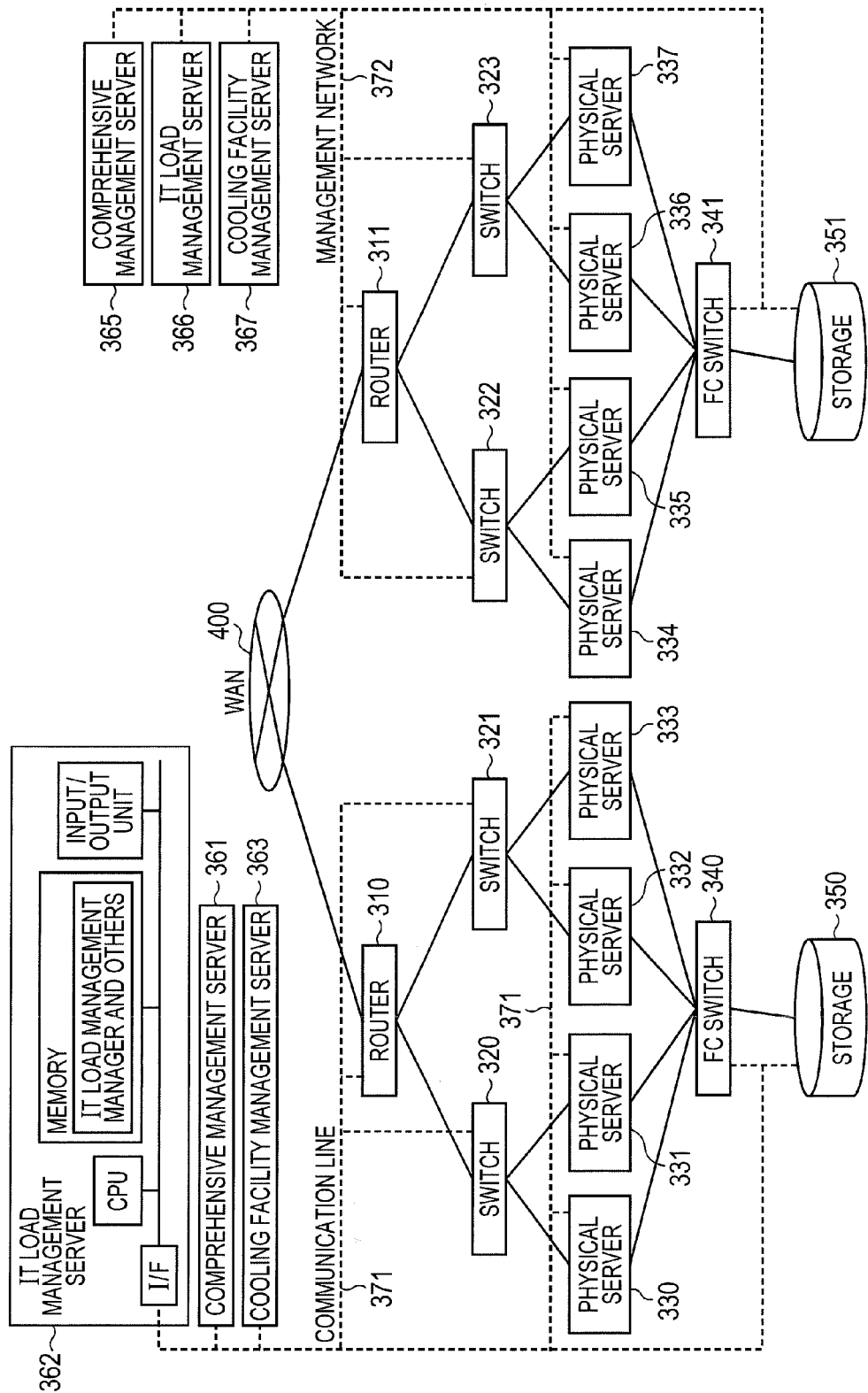
FIG. 9 is a diagram showing another example of the network structure for the information processing systems in accordance with the embodiments.

FIG. 8 and FIG. 9 schematically show the devices constituting the information processing system in accordance with any of the aforesaid embodiments in which an application executable environment is constructed on plural physical servers 330 to 337. FIG. 8 shows a case where the information processing system has one hub, while FIG. 9 shows a case where the information processing system has two hubs.

The information processing system includes physical servers 330 to 337, Fibre Channel (FC) switches 340 and 341, storages 350 and 351, switches 310 and 311, switches 320 to 323, a router 300 or wide-area network (WAN) 400, a comprehensive management server 361 or comprehensive management servers 361 and 365 in which the LAN manager, SAN manager, and virtualization manager included in the IT facility linkage optimization operational manager 180 make actions, an IT load management server 362 or IT load management servers 362 and 366 in which the IT load arrangement manager and power consumption manager make actions, and a cooling facility management server 363 or cooling facility management servers 363 and 367 in which the cooling facility manager makes an action.

Herein, the comprehensive management servers 361 and 365, IT load management servers 362 and 366, and cooling facility management servers 363 and 367 are ordinary computers each including a central processing unit (CPU) that is a processing unit, a memory that is a memory unit, an interface (I/F) unit, and an input/output unit. In the memory, the LAN manager, SAN manager, and virtualization manager, the IT load arrangement manager and power consumption manager, or the cooling facility manager, and various tables are stored. When the CPU runs a program, the capability of any of the managers is realized by referencing the tables.

Thus, the IT facility linkage optimization operational manager 180 is, as mentioned above, implemented by arranging the managers on the three servers. The number of servers may be other than three, and the managers may be arranged in any other form. Needless to say, the managers may be realized using one server, that is, one computer. In this specification, the servers may be generically called an operational management device. The servers are connected onto a physical communication line 371 directly or via a management network 370.

The physical servers 330 to 337 are servers on each of which a virtual machine or network distributed OS can be activated. As a method of activating, for example, a virtual machine on each of the physical servers 330 to 337, there is a method of activating software called generally a hypervisor or virtual machine monitor.

The comprehensive management server 361 or 365 can change virtual machines, which make actions in the physical servers 330 to 337, through management interfaces of the physical servers 330 to 337. The router 310 or 311 and switches 320 to 323 are network devices that intermediate traffic among virtual machines that make actions in the physical servers 330 to 337, or traffic among the virtual machines and the WAN 400 or router 300.

In the aforesaid information processing systems of the embodiments, traffic of plural customers or different attributes coexist, and the switches 320 to 323 are often requested to cope with a virtualization feature (virtual LAN or the like) that virtually separates networks associated with different attributes. The LAN manager in the comprehensive management server 361 modifies the settings for the virtualization feature (VLAN or the like) through any of the management interfaces of the switches 320 to 323 and physical servers 330 to 337.

The router 300 or WAN 400 is a network device that connects the information processing system of any of the embodiments to another information processing system on another network over the network, which accommodates the information processing system of any of the embodiments, and a wide-area network. The LAN manager in the comprehensive management server 361 can modify the settings of the virtualization feature (VLAN or the like) through the management interface of the router 300.

The FC switches 340 and 341 are network devices that intermediate traffic among the virtual machines, which make actions in the physical servers 330 to 337, and the storages 350 and 351.

In the information processing system of the present embodiment, traffic of plural customers or different attributes coexist. Therefore, the FC switches 340 and 341 have to cope with a virtualization feature (zoning, VSAN, or the like) that virtually separates networks associated with the different attributes. The SAN manager in the comprehensive management server 361 can modify the settings of the virtualization feature through any of the management interfaces of the FC switches 340 and 341.

The storages 350 and 351 are devices in which data to be used by the virtual machines is stored. The storages 350 and 351 provide the virtual machines with a boot area or data area. The SAN manager in the comprehensive management server 361 can modify the settings of the virtualization feature (zoning, VSAN, or the like) through any of the management interfaces of the storages 350 and 351.

When the IT load arrangement manager 186 produces a rearrangement plan for rearranging the virtual machines on the physical servers, the IT load arrangement manager 186 utilizes a configuration database of the information processing system. The configuration database contains device data, resource data, link data, and virtual machine resource reservation data, and is preserved as tables shown in FIG. 10 to FIG. 13. The various tables can be stored in any of the memories of the servers that serve as an operational management device for optimization to be described later.

Figure 10:
FIG. 10 is a diagram showing an example of device data for the information processing systems in accordance with the embodiments.

FIG. 10 shows an example of device data concerning the information processing system shown in FIG. 8 or FIG. 9. The device data is data representing devices in the information processing system. A column "device name" lists device names with which the devices in the information processing system are uniquely identified. A column "type" lists types of devices. In the present embodiment, the types shall include "physical server," "switch," "router," "FC switch," and "storage."

FIG. 11 shows an example of resource data concerning the information processing system shown in FIG. 8 or FIG. 9. The resource data is data representing resources owned by the devices specified in the device data. What are called the resources include "the number of CPU cores," "a CPU operating frequency," "a memory capacity," "a network interface card (NIC) bandwidth," and "a host bus adapter (HBA) bandwidth" of the physical server, "the NIC bandwidth" of the switch, "the NIC bandwidth" of the router, "the HBA bandwidth" of the FC switch, and "the HBA bandwidth" of the storage. An amount of data which a network device can handle per a unit time and a bandwidth supported by each port of the network device are also included in the resources.

A column "device name" lists device names, a column "resource type" lists resource types, a column "resource volume" lists volumes of the types of resources, which are specified in the column "resource type," of the devices specified in the column "device name."

FIG. 12 shows an example of link data concerning the information processing system shown in FIG. 8 or FIG. 9. The link data is data representing connectional relationships of the devices specified in the device data. A column "device name (connection source)" lists device names of devices existent at one ends of links, and a column "device name (connection destination)" lists device names of devices existent at the other ends of the links.

By referencing the link data, it is found that the physical server 330 and physical server 337 are connected to each other via the switch 320, switch 310, router 300, switch 311, and switch 323. In communication between an application in the physical server 330 and an application in the physical server 337, these devices intervene.

FIG. 13 shows an example of virtual machine resource reservation data concerning virtual machines that make actions in a virtualization environment constructed in the information processing system shown in FIG. 8 or FIG. 9.

The virtual machine resource preservation data is data time-sequentially representing virtual machines which are activated in the information processing system, and volumes of resources guaranteed for the virtual machines.

A column "T1-T2" lists resource volumes that should be guaranteed for the resources, which are specified in a column "resource type" of the virtual machines specified in a column "virtual machine," during a period from a time T1 to a time T2. A column "T2-T3" lists resource volumes to be guaranteed during a period from the time T2 to a time T3. A column "T3-T3" lists resource volumes to be guaranteed during a period from the time T3 to a time T4. A column "T4-T5" lists resource volumes to be guaranteed during a period from the time T4 to a time T5. A column "T5-T6" lists resource volumes to be guaranteed during a period from the time T5 to a time T6.

A "CPU working ratio" specified in the "resource type" signifies the number of CPU cores to be used by a virtual machine concerned and a CPU working ratio (percentage). A "memory usage" signifies a size (gigabytes) of a memory area to be used by the virtual machine. A "network access bandwidth" and a "network access communication destination" signify a virtual machine that is a party with which the virtual machine communicates over the network, and a bandwidth (Gbps) permitted for the communication. A "storage access bandwidth" signifies a bandwidth (Gbps) at which the virtual machine is permitted to access a storage.

If plural virtual machines are parties with which the virtual machine communicates over a network, the network access bandwidth and network access communication destination are designated for each of the parties. However, this case is omitted herein.

If the virtual machine gains access to plural storages, the storage access bandwidth and access destination storage are designated for each of the storages. However, this case is omitted herein.

The IT load arrangement manager produces rearrangement of virtual machines for each of the periods of time from the time T1 to time T2, from the time T2 to time T3, from the time T3 to time T4, from the time T4 to time T5, and from the time T5 to time T6 on the basis of the device data, resource data, link data, and virtual machine resource reservation data.

A row "physical server" in each row "virtual machine" signifies results produced by the IT load arrangement manager, that is, physical servers to which the virtual machine is allocated during the respective periods of time.

In the virtual machine reservation resource data presented in the present embodiment, since a virtual machine VM4 has eight CPU cores reserved, the virtual machine VM4 can be executed in the physical server 333 alone that is structured to have eight cores.

As for virtual machines VM1 and VM2, since the number of reserved CPU cores is four, the virtual machines can be executed in the physical servers 330, 331, and 333 that are structured to have four or more cores.

As for a virtual machine VM3, since the number of reserved CPU cores is two, the virtual machine can be executed in the physical servers 330, 331, 332, and 333 that are structured to have two or more cores.

During the period of time T1-T2, the CPU working ratios for the virtual machines VM1 to VM4 are all 50% or more. It is therefore impossible to arrange plural virtual machines on the same physical server. The IT load arrangement manager arranges the virtual machine VM1 on the physical server 330, the virtual machine VM2 on the physical server 331, the virtual machine VM3 on the physical server 332, and the virtual machine VM4 on the physical server 333.

During the period of time T2-T3, the sum total of the CPU working ratios for the virtual machines VM1 to VM4 is 80%, the sum total of the memory usages is 12.4 gigabytes, and the sum total of the storage access bandwidths is 0.8 Gbps or equal to or smaller than the resource volume of the physical server 333. Therefore, the IT load arrangement manager arranges all the virtual machines VM1 to VM4 on the physical server 333. Since no virtual machine is arranged on the physical servers 330, 331, and 332, the power supplies of the physical servers are turned off for the purpose of power saving.

During the period of time T3-T4, the CPU working ratios for the virtual machines VM1 to VM4 are all 20%. However, the memory usages for the virtual machines VM1 and VM2 are 7.0 gigabytes, the memory usage for the virtual machine VM3 is 3 gigabytes, and the memory usage for the virtual machine VM4 is 10.0 gigabytes. It is therefore impossible to arrange plural virtual machines on any one physical server. The IT load arrangement manager arranges the virtual machine VM1 on the physical server 330, the virtual machine VM2 on the physical server 331, the virtual machine VM3 on the physical server 332, and the virtual machine VM4 on the physical server 333.

During the period of time T4-T5, the CPU working ratios for the virtual machines VM1 and VM2 are 40%, and the CPU working ratio for the virtual machine VM3 is 70%. The IT load arrangement manager arranges the virtual machines VM1 and VM2 on the physical server 330, the virtual machine VM3 on the physical server 332, and the virtual machine VM4 on the physical server 333. Since no virtual machine is arranged on the physical server 331, the power supply of the physical server 331 is turned off for the purpose of power saving.

During the period of time T5-T6, the CPU working ratio for the virtual machine VM1 is 40%, the CPU working ratio for the virtual machine VM2 is 70%, and the CPU working ratio for the virtual machine VM3 is 20%. Seemingly, the virtual machine VM2 can be arranged on the physical server 331, and the virtual machines VM1 and VM3 can be arranged on the physical server 330. However, the virtual machine VM2 has reserved 0.7 Gbps communication with the virtual machine VM4 over a network, and the virtual machine VM3 has reserved 0.7 Gbps communication with the virtual machine VM4 over the network. If the above arrangement were adopted, the sum of the bandwidths would exceed the NIC bandwidth (1 Gbps) permitted by the switch 320. The IT load arrangement manager arranges the virtual machine VM1 on the physical server 330, the virtual machine VM2 on the physical server 331, the virtual machine VM3 on the physical server 332, and the virtual machine VM4 on the physical server 333.

As mentioned above, the IT load arrangement manager utilizes the configuration database of the information processing system so as to produce an arrangement plan for arranging virtual machines on physical servers, implements the arrangement plan, and turns off the power supply of the physical server on which no virtual machine is arranged. Thus, power saving of the information processing system is realized.

The invention made by the present inventor has been concretely described in relation to the embodiments. The present invention is not limited to the embodiments, but can be modified in various manners without a departure from the gist.

The present invention is not limited to the aforesaid embodiments but encompasses various variants. For example, the embodiments have been detailed for a better understanding of the invention. The present invention is not limited to an entity including all the aforesaid components.

Part of the components of a certain embodiment can be replaced with a counterpart of the components of any other embodiment. In addition, to the components of a certain embodiment, any of the components of any other embodiment may be added. Part of the components of each embodiment may be deleted or replaced with a counterpart of the components of any other embodiment, or any of the components of any other embodiment may be added to the components of each embodiment.

The aforesaid components, features, or processing units may be partly or entirely realized with hardware, or, for example, designed using integrated circuits. A case where the components or features are realized with software or by executing programs that describe the capabilities has been cited and described. Information such as the programs that describe the capabilities, tables, and files may be stored not only in a memory but also in a recording device such as a hard disk, solid-state drive (SSD), or the like, or in a recording medium such as an IC card, SD card, DVD, or the like. If necessary, the information may be downloaded over a network and then installed.

The embodiments can be adapted to comprehensive power-saving operational management in an information processing system including a group of information processing devices such as servers, storages, and networks, power-feeding facilities, and cooling facilities. More particularly, the embodiments are preferably applied to a data center that is an information processing base. The embodiments are employed in autonomous operational management of the information processing system, and applied to a wide range of usages while serving as a system construction tool, energy-saving diagnostic tool, working monitor tool, or an auxiliary tool for an operational managing person or a facility managing person.

Further, the embodiments can be applied not only to one place where a group of devices and facilities are installed but also plural places. For example, the embodiments will prove useful in data centers on plural floors, or data centers that are globally spread. The embodiments can be utilized in a case where information processing devices and facilities are decentralized like those in grid computing or cloud computing. Further, the embodiments are intended to deal mainly with a group of information processing devices and facilities. The embodiments can be applied to devices that consume power or energy and facilities associated with the devices. For example, the embodiments exert the usefulness in operation or control of an electric apparatus, mechanical apparatus, power unit, thermal apparatus, or the like. As for a system scale, the embodiments may be applied to a system including a group of electronic parts and power supplies or coolers, or a system including a group of information processing modules, power units, and cooling units. The embodiments can also be applied to a cooling environment including a group of data centers and an electric generation plant or site. Thus, the embodiments contribute to power saving or energy saving.

What is claimed is:

1. A power-saving control method for an information processing system, which includes a group of information processing devices having a plurality of types of information processing devices interconnected, and cooling facilities that cool the group of information processing devices, comprising the steps of:

acquiring, as working information, information on workloads in the group of information processing devices, and, as arrangement information, positions of the information processing devices, environmental information on the cooling facilities, and positions of the cooling facilities;

estimating the working information on the workloads in the group of information processing devices for a certain period of time from a predetermined timing;

allocating tentative workloads to the group of information processing devices from the estimated working information to assure that the working information will not exceed performance of the group of information processing devices for the certain period of time;

calculating tentative power consumptions and tentative arrangement information resulting from allocating the tentative workloads to the group of information processing devices, tentative power consumptions of the group of information processing devices, and arrangement information necessary for allocating the tentative workloads to the group of information processing devices, wherein the tentative power consumptions take into account a power consumption needed to migrate the tentative workloads from a first processing device to a second processing device and power saved by turning off power to the first processing device at a point in the migration process;

based on the results of the calculation, calculating tentative cooling powers required to control the cooling facilities;

searching optimal allocation of the tentative workloads to the group of information processing devices so as to minimize a sum total of the tentative power consumptions of the group of information processing devices and the tentative cooling powers of the cooling facilities for the certain period of time from the predetermined timing; and at the predetermined timing, based on the searched optimal allocation of the tentative workloads, allocating the workloads to the group of information processing devices, and controlling the cooling facilities in relation to actual power consumptions necessary for actual allocation of the workloads.

2. The power-saving control method for an information processing system according to claim 1, wherein:

allocating the tentative workloads to the group of information processing devices is deduced from workloads scheduled for the certain period of time and the working information on the workloads;

tentative power consumptions for the tentative workloads to be allocated to the group of information processing devices are calculated based on the estimated working information scheduled for the certain period of time; and the cooling facilities are controlled prior to actually allocating the workloads to the group of information processing devices.

3. The power-saving control method for information processing system according to claim 2, wherein the certain period of time is a day, week, or month.

4. The power-saving control method for information processing system according to claim 1, wherein:

as the working information, a use ratio of an arithmetic processing unit of each of the information processing devices, a memory usage, a bandwidth permitted for access to a storage to be gained based on a topology, and a bandwidth permitted for access to a network are acquired; and the tentative workloads are allocated to assure that the working information acquired will not exceed actual permissible values for the group of information processing devices.

5. The power-saving control method for information processing system according to claim 1, wherein:

as the working information, a latency of access to a storage to be gained based on a topology in which the information processing devices are interconnected and a latency of access to a network are acquired; and the tentative workloads are allocated to assure that the working information will not exceed predetermined permissible latencies.

6. The power-saving control method for information processing system according to claim 1, wherein:

the group of information processing devices constructs a virtualization environment and is managed by a virtualization manager; and allocating the workloads to the group of information processing devices is achieved by arranging a plurality of virtual machines on the group of information processing devices via the virtualization manager.

7. The power-saving control method for information processing system according to claim 1, wherein:

the group of information processing devices is managed by network distributed operating systems; and allocating the workloads to the group of information processing devices is achieved by arranging a plurality of processes on the network distributed operating systems.

8. An information processing system comprising:

a group of information processing devices having a plurality of types of information processing devices interconnected;

facilities that cool the group of information processing devices; and an operational management device, wherein the operational management device includes a processing unit and a memory unit;

the memory unit stores working information on workloads in the group of information processing devices, and arrangement information on positions of the information processing devices, environmental information on the cooling facilities, and positions of the cooling facilities;

the processing unit estimates the working information on the workloads in the group of information processing devices for a certain period of time;

the processing unit allocates tentative workloads to the group of information processing devices from the estimated working information to assure that the estimated working information on the workloads will not exceed performance of the group of information processing devices for the certain period of time;

the processing unit calculates tentative power consumptions and tentative arrangement information resulting from allocating the tentative workloads to the group of information processing devices, tentative power consumptions of the group of information processing devices, and tentative arrangement information necessary for allocating the tentative workloads to the group of information processing devices, wherein the tentative power consumptions take into account a power consumption needed to migrate the tentative workloads from a first processing device to a second processing device and power saved by turning off power to the first processing device at a point in the migration process;

based on the results of the calculation, the processing unit calculates tentative cooling powers required to control the facilities;

the processing unit searches optimal allocation of the tentative workloads so as to minimize a sum total of the tentative power consumptions of the group of information processing devices and the tentative cooling powers of the facilities for the certain period of time; and at the predetermined timing, based on the searched optimal allocation of the tentative workloads, the processing unit allocates the workloads to the group of information processing devices, and controls the facilities in relation to actual power consumptions necessary for actual allocation of the workloads.

9. The information processing system according to claim 8, wherein the processing unit allocates the tentative workloads to the group of information processing devices from workloads scheduled for the certain period of time and the working information on the workloads, calculates tentative power consumptions for the tentative workloads, which are allocated to the group of information processing devices, on the basis of the estimated working information scheduled for the certain period of time, and controls the cooling facilities prior to actually allocating the workloads to the group of information processing devices.

10. The information processing system according to claim 9, wherein the certain period of time is a day, week, or month.

11. The information processing system according to claim 8, wherein the processing unit acquires, as the working information, a use ratio of an arithmetic processing unit of each of the information processing devices, a memory usage, a bandwidth permitted for access to a storage to be gained based on a topology, and a bandwidth permitted for access to a network, and allocates the tentative workloads to assure that the estimated working information will not exceed actual permissible values for the group of information processing devices.

12. The information processing system according to claim 8, wherein the processing unit acquires, as the working information, a latency of access to a storage to be gained based on a topology in which the information processing devices are interconnected, and a latency of access to a network, and allocates the tentative workloads to assure that the working information will not exceed predetermined permissible latencies.

13. The information processing system according to claim 8, wherein:
   the operational management device uses a virtualization manager to manage the group of information processing devices; and
   allocating the workloads to the group of information processing devices is achieved by arranging a plurality of virtual machines on the group of information processing devices via the virtualization manager.

14. The information processing system according to claim 8, wherein:
   the operational management device uses network distributed operating systems to manage the group of information processing devices; and
   allocating the workloads to the group of information processing device is achieved by arranging a plurality of processes on the network distributed operating systems.

15. An operational management device that manages the operation of a group of information processing devices having a plurality of types of information processing devices interconnected, and of facilities which control the temperatures of the group of information processing devices, comprising:
   a processing unit; and
   a memory unit, wherein
   the memory unit stores working information on workloads in the group of information processing devices, and arrangement information on positions of the information processing devices, environmental information on the facilities, and positions of the facilities;
   the processing unit estimates the working information on the workloads in the group of information processing devices for a certain period of time;
   the processing unit allocates tentative workloads to the group of information processing devices from the estimated working information to assure that the estimated working information will not exceed performance of the group of information processing devices for the certain period of time;
   the processing unit calculates tentative power consumptions and arrangement information resulting from allocating the tentative workloads, tentative power consumptions of the group of information processing devices, and tentative arrangement information necessary for allocating the tentative workloads to the group of information processing devices, wherein the tentative power consumptions take into account a power consumption needed to migrate the tentative workloads from a first processing device to a second processing device and power saved by turning off power to the first processing device at a point in the migration process;
   based on the results of the calculation, the processing unit calculates tentative power consumptions required to control the facilities;
   the processing unit searches optimal allocation of the tentative workloads to the group of information processing devices so as to minimize a sum total of the tentative power consumptions of the group of information processing devices and the tentative power consumptions of the facilities for the certain period of time; and
   based on the searched optimal allocation of the tentative workloads, the processing unit allocates the workloads to the group of information processing devices, and controls the facilities in relation to actual power consumptions necessary for the actual allocation of the workloads.

* * * * *